US008316417B2

(12) United States Patent
Di Battista et al.

(10) Patent No.: US 8,316,417 B2
(45) Date of Patent: Nov. 20, 2012

(54) METHOD FOR DYNAMIC SECURE MANAGEMENT OF AN AUTHENTICATED RELATIONAL TABLE IN A DATABASE

(75) Inventors: Giuseppe Di Battista, Rome (IT); Bernardo Palazzi, Rome (IT)

(73) Assignee: Universita' Degli Studi Roma Tre, Rome (IT)

( * ) Notice: Subject to any disclaimer, the term of this patent is extended or adjusted under 35 U.S.C. 154(b) by 503 days.

(21) Appl. No.: 12/442,147

(22) PCT Filed: Sep. 20, 2007

(86) PCT No.: PCT/IT2007/000654
§ 371 (c)(1),
(2), (4) Date: Oct. 22, 2009

(87) PCT Pub. No.: WO2008/035390
PCT Pub. Date: Mar. 27, 2008

(65) Prior Publication Data
US 2010/0043057 A1    Feb. 18, 2010

(30) Foreign Application Priority Data
Sep. 20, 2006   (IT) .............................. BO2006A0648

(51) Int. Cl.
*G06F 7/04* (2006.01)
(52) U.S. Cl. .............................. 726/2; 713/166; 709/201
(58) Field of Classification Search ...... 726/2; 713/166; 709/201
See application file for complete search history.

(56) References Cited

U.S. PATENT DOCUMENTS

| 5,664,179 | A | 9/1997 | Tucker | |
| 6,266,675 | B1 * | 7/2001 | Evans et al. ........................... | 1/1 |
| 2004/0107346 | A1 * | 6/2004 | Goodrich et al. ............. | 713/176 |

OTHER PUBLICATIONS

.Skip List Based Authenticated Data Structure in DAS Paradigm Jieping Wang; Xiaoyong Du. Grid and Cooperative Computing, 2009. GCC '09. Eighth International Conference on (978-0-7695-3766-5) 2009. p. 69-75.*
.Implementation of an authenticated dictionary with skip lists and commutative hashing Goodrich, M.T.; Tamassia, R.; Schwerin, A. DARPA Information Survivability Conference & Exposition II, 2001. DISCEX '01. Proceedings (0-7695-1212-7) 2001. vol. 2;p. 68-82 vol. 2.*

(Continued)

*Primary Examiner* — Thanhnga B Truong
*Assistant Examiner* — Angela Holmes
(74) *Attorney, Agent, or Firm* — Workman Nydegger

(57) ABSTRACT

Method for the dynamic secure management of an authenticated relational table forming part of a database; the method comprises the following steps: store the authenticated relational table in a secondary memory' with a high storage capacity and a slow data access time; maintain an authenticated skip list within the authenticated relational table in order to create an authentication superstructure; determine a signed hash or basis value which characterizes the entire authenticated relational table; authenticate the presence or otherwise of a set of elements belonging to the skip list via a root path suitable for calculating a check hash value comparable to the signed hash value which characterizes the entire authenticated relational table; and validate the result of the authentication step by checking that the check hash value calculated by means of the root path is equal to the signed hash value that characterizes the entire authenticated relational table.

12 Claims, 22 Drawing Sheets

OTHER PUBLICATIONS

Goodrich MT et al: "Implementation of an authenticated dictionary with skip lists and commutative hashing" DARPA Information Survivability Conference & Exposition II, 2001, Discex '01. Proceedings Jun. 12-14, 2001, Piscataway, NJ USA, IEEE, vol. 2, Jun. 12, 2001 pp. 68-82.

Michael T Goodrich et al: "On the Cost of Persistence and Authentication in Skip Lists" Experimental Algorithms Lecture Notes in Computer Science;; LNCS, Springer Berlin Heidelberg, BE, vol. 4525, 1900, pp. 94-107 (2007).

Pugh W: "Skip Lists: A Probabalistic Alternative to Balanced Trees" Algorithms and Data Structures. International Workshop, XX, XX, 1989, pp. 437-449.

International Search Report and Written Opinion in application PCT/IT2007/000654 completed Apr. 16, 2008; mailed Apr. 23, 2008.

* cited by examiner

Fig. 5

| Key | Prv 0 | Nxt 0 | Prv 1 | Nxt 1 | Prv 2 | Nxt 2 |
|-----|-------|-------|-------|-------|-------|-------|
| −∞ | null | 5 | null | 5 | null | 6 |
| 5 | −∞ | 6 | −∞ | 6 | | |
| 6 | 5 | 8 | 5 | 9 | 10 | +∞ |
| 8 | 6 | 9 | | | | |
| 9 | 8 | 10 | 6 | 10 | | |
| 10 | 9 | +∞ | 9 | +∞ | 6 | +∞ |
| +∞ | 10 | null | 10 | null | 10 | null |

Fig. 7

| Key | Level | prvKey | nxtKey | parentLvl | parentKey |
|---|---|---|---|---|---|
| -∞ | 0 | null | 5 | 1 | -∞ |
| -∞ | 1 | null | 5 | 2 | -∞ |
| -∞ | 2 | null | 6 | null | null |
| 5 | 0 | -∞ | 6 | 1 | 5 |
| 5 | 1 | -∞ | 6 | 1 | -∞ |
| 6 | 0 | 5 | 8 | 1 | 6 |
| 6 | 1 | 5 | 9 | 2 | 6 |
| 6 | 2 | -∞ | 10 | 2 | -∞ |
| 8 | 0 | 6 | 9 | 0 | 6 |
| 9 | 0 | 8 | 10 | 1 | 9 |
| 9 | 1 | 6 | 10 | 1 | 6 |
| 10 | 0 | 9 | +∞ | 1 | 10 |
| 10 | 1 | 9 | +∞ | 2 | 10 |
| 10 | 2 | 6 | +∞ | 2 | 6 |
| +∞ | 0 | 10 | null | 1 | +∞ |
| +∞ | 1 | 10 | null | 2 | +∞ |
| +∞ | 2 | 10 | null | 2 | 10 |

Fig. 9

| Key | Hash 0 | Prv 0 | Nxt 0 | Hash 1 | Prv 1 | Nxt 1 | Hash 2 | Prv 2 | Nxt 2 |
|---|---|---|---|---|---|---|---|---|---|
| $-\infty$ | $f(-\infty,5)$ | null | 5 | $f(f(-\infty),f(5))$ | null | 5 | $f(f(-\infty),f(6))$ | null | 6 |
| 6 | $f(6,f(8))$ | 5 | 8 | $f(f(6),f(9))$ | 5 | 9 | $f(f(6),f(10))$ | 10 | $\infty$ |
| 9 | $f(9,10)$ | 8 | 10 | $f(9,10)$ | 6 | 10 | | | |
| 10 | $f(10,+\infty)$ | 9 | $+\infty$ | $f(10,f(+\infty))$ | 9 | $+\infty$ | $f(10,f(+\infty))$ | 6 | $+\infty$ |

Fig. 10

| Key | Level | prvKey | nxtKey | parentLvl | parentKey | Hash |
|-----|-------|--------|--------|-----------|-----------|------|
| $-\infty$ | 2 | null | 6 | null | null | $f(f(-\infty), f(6))$ |
| $-\infty$ | 1 | null | 5 | 2 | $-\infty$ | $f(f(-\infty), f(5))$ |
| 6 | 2 | $-\infty$ | 10 | 2 | $-\infty$ | $f(f(6), f(10))$ |
| 6 | 1 | 5 | 9 | 2 | 6 | $f(f(6), f(9))$ |
| 6 | 0 | 5 | 8 | 1 | 6 | $f(6, f(8))$ |
| 9 | 1 | 6 | 10 | 1 | 6 | $f(9, 10)$ |
| 9 | 0 | 8 | 10 | 1 | 9 | $f(9, 10)$ |
| 10 | 2 | 6 | $+\infty$ | 2 | 6 | $f(f(10), f(+\infty))$ |
| 10 | 1 | 9 | $+\infty$ | 2 | 10 | $f(f(10), f(+\infty))$ |

Fig. 16

| Key | Level | prvKey | nxtKey | parentLvl | parentKey | Left | Right |
|---|---|---|---|---|---|---|---|
| $-\infty$ | 2 | null | 6 | null | null | 1 | 28 |
| $-\infty$ | 1 | null | 5 | 2 | $-\infty$ | 2 | 9 |
| $-\infty$ | 0 | null | 5 | 1 | $-\infty$ | 3 | 4 |
| 5 | 1 | $-\infty$ | 6 | 1 | $-\infty$ | 5 | 8 |
| 5 | 0 | $-\infty$ | 6 | 1 | 5 | 6 | 7 |
| 6 | 2 | $-\infty$ | 10 | 2 | $-\infty$ | 10 | 27 |
| 6 | 1 | 5 | 9 | 2 | 6 | 11 | 20 |
| 6 | 0 | 5 | 8 | 1 | 6 | 12 | 15 |
| 8 | 0 | 6 | 9 | 0 | 6 | 13 | 14 |
| 9 | 1 | 6 | 10 | 1 | 6 | 16 | 19 |
| 9 | 0 | 8 | 10 | 1 | 9 | 17 | 18 |
| 10 | 2 | 6 | $+\infty$ | 2 | 6 | 21 | 26 |
| 10 | 1 | 9 | $+\infty$ | 2 | 10 | 22 | 25 |
| 10 | 0 | 9 | $+\infty$ | 1 | 10 | 23 | 24 |

METHOD FOR DYNAMIC SECURE MANAGEMENT OF AN AUTHENTICATED RELATIONAL TABLE IN A DATABASE

TECHNICAL SECTOR

The present invention relates to a method for the dynamic safe management of an authenticated relational table in a database.

PRIOR ART

There are many elements relative to security to be taken into consideration in the construction of a secure database. Considering that the database administrator or even the DBMS (DataBase Management System) itself may not be totally reliable, in the present invention the database is not trusted.

Furthermore, in the present invention problems such as access or copying of the database content once an attack has succeeded in obtaining administrator privileges or direct control of the hardware are not taken into consideration. Methods exist that can limit the damage, such as encrypting of the data or file system containing the table to be protected. Techniques for user authentication and access control can also be considered complementary to this invention.

There are numerous applications in which authenticated tables can be very useful; in general it can be said that wherever there is a database with sensitive information, the invention presented here can be of use.

The possible applications of this invention are numerous and concern the possibility of equipping the DBMS sold with instruments that increase the level of security and reliability.

WO0239659A1 (corresponding to US2004107346A1) describes a practical efficient method for dynamically maintaining an authenticated dictionary; a data structure consisting of a skip list and hash communication functions are used to create a database that contains a dictionary and stores objects that can be authenticated individually (i.e. recognised as belonging or not belonging to the database). The authentication consists in a short sequence of values which begins with an element and a sequence of values which, when processed with a cryptographic associative hash function, creates the same value as the hashed digest of the entire dictionary. Instead of hashing up a dynamic tree, the hashes are created in a skip list. Validation of the result of an authentication phase is positive if the hash of the short sequence of values corresponds to a signed hash of the entire skip list.

DISCLOSURE OF INVENTION

The object of the present invention is to provide a method for the dynamic secure management of an authenticated relational table in a database, said method being easy and inexpensive to implement.

The main objective of the present invention is to allow users to verify the authenticity, integrity and completeness of the response to a query on a relational table; furthermore, the present invention permits dynamic management of updating of the data content within a database.

According to the present invention a method is provided for the dynamic secure management of an authenticated relational table in a database in accordance with the attached claims.

The main aim of the present invention is to create a practical efficient external plug-in to a DBMS (DataBase Management System) which permits a posteriori authentication of the result of a query; the approach chosen permits operation independently of the DBMS adopted and allows a logarithmic complexity to be obtained with respect to the number of data.

Another important element of the present invention is the addition of a security system, which permits to check the integrity, completeness and authenticity when using the main primitives typical of the databases; this result is obtained due to the maintenance of a cryptographic superstructure based on authenticated skip lists. The present invention proposes a new security scheme for the relational tables, based on authenticated skip lists, with original methods for representation of the authenticated data and query structures optimised within relational tables. The architecture is efficient and secure, since all the data are contained within a database and externally the program created permits secure update and query management. The scheme devised also permits application to all types of DBMS, since the interaction is managed by standard connection technologies and common SQL language.

The use of a DBMS for filing the data allows the user to work efficiently with large-size tables. An innovative query formulation mechanism (based on nested sets) permits efficient selection only of the elements necessary for validating the authenticity of the result obtained. The amount of information used in the system proposed is linked in logarithmic proportion to the number of elements present in the entire table. This property is linked to the identified data structure and is of great importance as it permits minimisation of the overhead for authenticating queries. This approach makes it possible to use the invention in contexts where instruments are available with modest calculation and memory capacities.

The present invention is based on two new innovative ideas. The first innovative idea is the use of authenticated skip lists for the management of relational tables instead of the Merkle hash trees; this allows better performance to be obtained with lower complexity in data updating and the same computational cost in the queries. The second innovative idea consists in the introduction of original methods for storing authenticated skip lists within a relational table and particularly optimised queries which permit efficient, dynamic and secure management of the request for and updating of the information contained within the DBMS.

BRIEF DESCRIPTION OF THE DRAWINGS

The present invention will now be described with reference to the accompanying drawings, which illustrate a non-limiting embodiment in which:

FIG. 5 is a representation of the skip list of FIG. 4 in a relational table with coarse-grained approach;

FIG. 7 is a representation of the skip list of FIG. 6 in a relational table with fine-grained approach;

FIG. 9 is a representation of a coarse-grained table with the elements necessary to authenticate a value with key 9;

FIG. 10 is a representation of a fine-grained table with the elements necessary to authenticate the value with key 9;

FIG. 16 is a representation in a relational table of the skip list using the nested set technique;

PREFERRED EMBODIMENTS OF THE INVENTION

The method subject of the present invention is aimed at dynamic management of relational tables in a secure way via the use of authenticated data structures. The method is based on the use of authenticated skip lists, which are represented with original methods within associative structures such as relational tables and on an efficient query system which permits selection only of the data strictly necessary also in very large tables.

The main characteristic of the invention consists in introduction into the DBMS (DataBase Management System) of a security system which permits a posteriori certification of the integrity and authenticity of the result of a query on a table with the possibility of verifying corruption of the entire table from control of a single record. The applications are numerous and involve the entire sector of the DBMS, above all in the handling of sensitive data. The possibility of efficiently managing the updating of a table permits extension of this technique also to mobile devices, such as handheld computers, mobile phones or smart cards.

Figure 1:
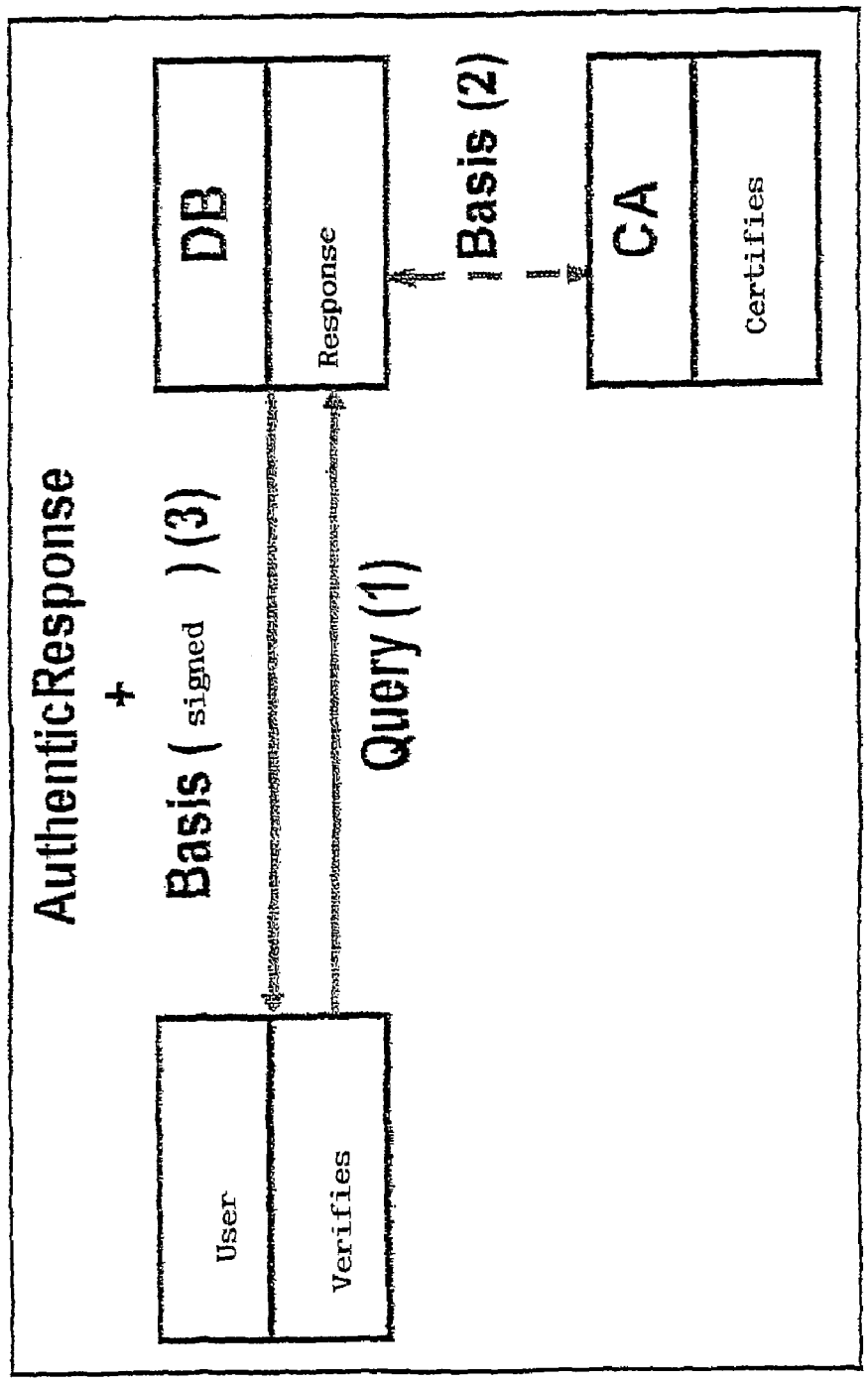
FIG. 1 represents a diagram which shows the data exchanged between the parties in the method for secure management of authenticated relational tables devised in accordance with the present invention.

FIG. 1 shows a block diagram which illustrates a user, an untrusted database and a secure source or certification authority CA.

The certification authority CA has the job of authenticating and distributing to the various system users the basis, i.e. the element that represents the value necessary for validating the authenticated data structures. By affixing its private key on the basis, the certification authority CA will allow all the users, via use of the public key of the certification authority CA, to validate the value of the basis and therefore to verify the information present in the database. The insertion by the certification authority CA of a cryptographic time marker within the basis tells the user, in an authenticated manner, when the data item requested by it was valid.

All the information necessary to validate the result of a query is found within the database and the basis element constitutes the only data item replicated on the certification authority CA; replication on the certification authority CA is necessary to guarantee greater security and permit efficient distribution. The database does not need to be secure and therefore there is complete freedom in terms of choice of this component which can also be used in a network or replicated.

The user performs a query on the database (directly or by means of a network replication) via a query application. The verification of a data item is performed via the acquisition in secure mode of the basis signed by the certification authority CA. The verification takes place via acquisition of the query result together with the authentication superstructure (these items can also be sent in alphanumeric form) without the need to use any technique for secure transmission of the information. The user can check the authenticity of the query result by recalculating the basis from the information provided and checking correspondence with the one obtained in secure mode from the certification authority CA. Modification of the information present in the database by a user entails modification of the corresponding basis; consequently, the user must recalculate the basis during updating, must send the recalculated basis in secure mode to the certification authority CA, affixing its digital signature on it with a time marker, and must send in alphanumeric form the recalculated basis to the database to perform the update.

The data structure used to maintain within said database the information concerning secure management of a table together with the query and update mechanism is called authenticated table.

An authenticated table should comply with the following objectives:

low computational cost: the calculation time necessary for each entity (certification authority CA, database and user) should be as short as possible and likewise the memory space used should be as small as possible;

overhead for communication: the exchange of information between the certification authority CA and the database and between the certification authority CA and the user must be reduced solely to exchange by means of cryptographic transmission of a security key which permits authentication of the entire relational table; the traffic between the database and the user is transmitted by means of alphanumeric communication, but the objective is always to limit as far as possible the amount of data exchanged;

high security: the authenticity of the data provided in response to a query must be verified with a high level of reliability;

portability: it must be possible to use the application on a generic relational DBMS and therefore the interactions with the database must be performed by means of standard connection instruments.

The above objectives can take the form of algorithmic problems for minimisation of the following cost parameters of an authenticated table for an assigned set:

space used by the data structure;

time necessary for performing an authenticated database update by the user;

time taken by the DBMS to respond to a query and simultaneously provide the information for verifying the authenticity of the result;

dimension of the response to a query to a DBMS between the database and the user;

time necessary for the user to verify the information provided by a query.

There are many elements concerning security to be taken into consideration in relation to the construction of a secure database. Considering that the database administrator or even the DBMS itself may not be totally reliable, in the present invention the database is not trusted.

In the following description n indicates the number of elements present in a set S of elements stored in an authenticated table TA comprising a hash tree T.

The introduction of an authenticated data structure comprising a hash tree is due to Ralph C. Merkle (in Ralph C. Merkle. *Protocols for Public Key Cryptosystems. In Proc. of the Symposium on Security and Privacy*, pages 122-133, Oakland, certification authority CA, U.S.A., April 1980. IEEE Computer Society); however, the authenticated data structures proposed by Ralph C. Merkle can be used only for the construction of static authenticated dictionaries, i.e. it is impossible to update the data unless the authentication structure is completely reconstructed.

A hash tree T for a set of elements S stores the elements S on the leaves of the hash tree T and a hash value f(v) for each node v with the following method:
  if v is a leaf: f(v)=h(x), where x is the element stored in x and h is a collision-resistant cryptographic hash function;
  if v is an internal node: f(v)=h(f(u),f(w)), where u and w are the left child and right child respectively of the internal node v.

The authenticated table TA for the set S consists of the hash tree T together with the joint signature of a time marker and the value f(r) kept in the root r of the hash tree T. An element x belongs to the set S, if it can be verified by control of the sequence of values stored in the elements adjoining the nodes on the path from the node x to the root r. Each of these values must be identified as belonging to the left child or right child of the node, so that the user can recalculate the hash value of the root and compare it with the value currently signed.

It is fundamental for the user to be provided with all the information concerning the order and links, otherwise it will be practically impossible for the user to derive the hash value of the root. Said hash tree scheme can be extended to validate non-membership of an object x of the set S, maintaining the leaves of the hash tree T ordered and therefore restoring the path from the node to the root, for two elements y and z such that y and z are stored in two consecutive leaves of the hash tree T and y<x<z. The method proposed is valid also at the extremes considering the following cases: y is indefinite and z is the leaf farthest to the left or z is indefinite and y is the leaf farthest to the right. The use of this method requires the user to have a good knowledge of the binary trees, so that he/she can verify from the topology of the two paths that y and z are stored in two consecutive leaves.

The first study that introduces the possibility of verifying the completeness and authenticity of the results of a query produced by an untrusted external publisher was published in 2001 (C. Martel, G Nuckolls, P. Devanbu, M. Gertz, A. Kwong, S. Stubblebine. *A General Model for Authenticated Data Structures. Technical Report CSE*-2001); according to this publication the owner of the data is required to construct a Merkle hash tree (MHT) on each table belonging to the database and to distribute the hash of the root signed directly to the users. To authenticate the result for a query with interval [a, b] on an ordered list $(r_1, r_2, \ldots r_n)$, the publisher needs to reveal to the user the two records which are immediately before and after the interval of the query. In other words, the result of the query becomes:

$$(r_{i-1}, r_i, \ldots, r_j, r_{j+1})$$

$$r_{i-1} < a \leq r_i$$

$$r_j \leq b < r_{j+1}$$

$$1 < i \leq j < n$$

The user can therefore validate the expanded result obtained, together with the associated authentication superstructure by calculating the value of the root of the ADS and verifying correspondence with the control value obtained in a secure manner.

A more recent work on verification of query completeness in the publication of data (relational) by unreliable publishers was published in 2005 (H. Pang, A. Jain, K. Ramamritham, K. Tan, *Verifying completeness of relational query results in data publishing, SIGMOD,* 2005); in this publication a scheme is presented for the authentication of results generated by query solvers considered unreliable. The scheme proposed allows the query processor to provide proof that each result is complete (for example that there are no records omitted in the result) and authentic (for example all the values returned come from the owner).

The technique used in the present invention does not need to reveal more data than required in the query, therefore it does not contradict the possible database access control policies. In particular, the technique used in the present invention maintains use of the Merkle hash tree as a data structure for filing of the information while introducing a new verification method, no longer based on calculation of the root-leaf path, but only on the construction of a root path within the result obtained by the query made. Said method exploits the contiguity between the elements belonging to the result and introduces two fictitious elements at the lower and upper extremes, as delimiters of the result, so that they constitute the first and last element belonging to the ordered list of values returned by the query made. Verification of the contiguity can be proved by the creation of a signature for each element $r_i$ belonging to the result, with i ranging from 1 to the number of elements of the response n, based on the near left and right:

$$\text{sig}(r_i) = s(h(g(r_{i-1})|g(r_i)|g(r_{i+1})))$$

s represents a function that signs the element using the private key of the owner;
h is a collision-resistant hash function;
$g(r_i)$ is a function that produces a digest for each record $r_i$ and is defined simply $g(r_i)=h(r_i)$; and
the symbol | means chaining.

Together with the result the publisher will provide the associated signatures:

$$\text{sig}(r_i), a \leq i \leq n+1, piùg(r_{a-1})eg(r_{n+1})$$

The user will therefore calculate the digest for each element in Q and will check the authenticity of the information returned using the signatures:

$$s^{-1}(\text{sig}(r_i))=h(g(r_{i-1})|g(r_i)|g(r_{i+1}))$$

to verify that successive elements in Q are also near in the original list R.

This new method for calculating the root path requires the identification of a particular additive hash function such that h(x+y)=h(x) or h(y). The utility of such a hash function can be shown by taking as an example a query which requires all the largest elements of a known value: $r_{a-1} < \alpha$ *and redefining the value g as* $g(r_i)=h(U-r_i)$. The publisher can, at this point, provide only $h(\alpha-r_{a-1})$ and the user must calculate $h(U-\alpha)$ and subsequently $g(r_{a-1})=h(U-r_{a-1})=h(U-\alpha) \circ h(\alpha-r_{a-1})$. In this way the user can derive $g(r_{a-1})$ knowing U and $\alpha$, without having to know the value of $r_{a-1}$.

The function identified in the above publication of 2005 (H. Pang, A. Jain, K. Ramamritham, K. Tan, *Verifying completeness of relational query results in data publishing, SIGMOD,* 2005) consists of $g(r)=h^{U-r-1}(r)$, with $h^i(r)$ defined iteratively as $h^i(r)=h^{i-1}(h(r))$ with $h^0(r)$ collision-resistant hash function. The approach of the present invention allows the complexity to be linked to the dimension of the query response, eliminating computational dependence on the number of elements present in the table. The above approach differs from the proposed invention due to the need to provide, in a secure manner, a higher number of elements to guarantee the integrity of the result. One of the cornerstones of the present invention is that the integrity of the response to a query can be guaranteed by secure distribution of one single hash value.

For the purposes of realisation of the invention, the work by Goodrich and Tamassia (M. T. Goodrich, A. Schwerin, and R. Tamassia. *An efficient dynamic and distributed cryptographic accumulator. Technical Report*, Johns Hopkins Information Security Institute, 2000—M. T. Goodrich and R. Tamassia. *Efficient authenticated dictionaries with skip lists and commutative hashing. Technical Report*, Johns Hopkins Information Security Institute, 2000) on authenticated data structures (ADS) has been of great importance. Their study was aimed above all at the construction of authenticated dictionaries and introduced two innovations onto the authenticated data structure scene. The first innovation consisted of the "authenticated skip list", a different data structure from the Merkle hash trees. The skip list was introduced by Pugh (William Pugh. *Skip lists: A probabilistic alternative to balanced trees*. pages 437-449, 1989) and is very advantageous in insertion and deletion of data in an ordered set. The skip list uses random choices in its construction and to maintain the elements ordered. These choices have been designed in such a way that the mean computational complexity for the search and updating is logarithmic. In realisation of the authenticated skip list the commutative hash has been used, to simplify the method of authentication and to reduce its complexity. Said methodology considerably simplifies the verification process for the user, while maintaining the basic security characteristics, such as signing the collection of values by means of cryptographic hashing.

This latter structure will be taken as a reference for development of the authenticated databases.

The use of authenticated data structures (ADS) to validate the data contained in relational tables offers considerable security with low computational cost, but has not yet been widely explored. In the context of security of the DBMS, the invention represents a completely innovative technique, since in the existing databases security is generally relegated to user authentication techniques and auditing. The innovation, in theoretical terms, consists in introduction into the DBMS of a technique for user-side a posteriori verification of the data received, which permits certification not only that the single piece of information is authentic, but also that the entire context in which it operates is authentic. From the technical point of view, it represents a solution that permits dynamic management of the data in a relational table and which scales also for very large tables, maintaining verification times practically constant. Said results are made possible due to the use of original techniques for the representation of hierarchical data structures in relational tables, variable according to the level of granularity chosen, and appropriate queries which permit efficient selection only of the elements necessary for authentication.

Skip List

A skip list S (as described by W. Pugh in the publication referred to above) for an ordered data set D consists in a series of lists $\{S_o, S_1, \ldots, S_h\}$. Each list $S_i$ contains a subset of the objects contained in D ordered via a non-decreasing key together with objects with two special keys denoted by $-\infty$ and $+\infty$.

$-\infty$ is smaller than any possible key value that can be inserted in D;
$+\infty$ is larger than any possible key value that can be inserted in D.

In addition to this, the lists in S satisfy the following conditions:

the list $S_0$ contains all the objects of the ordered set D (plus the special objects with keys $-\infty$ and $+\infty$);
for $i=1, \ldots h-1$, the list $S_i$ contains (in addition to the special objects $-\infty$ and $+\infty$) a subset of the objects in the list $S_{i-1}$ generated at random;
the list $S_h$ contains only $-\infty$ and $+\infty$.

Figure 3:
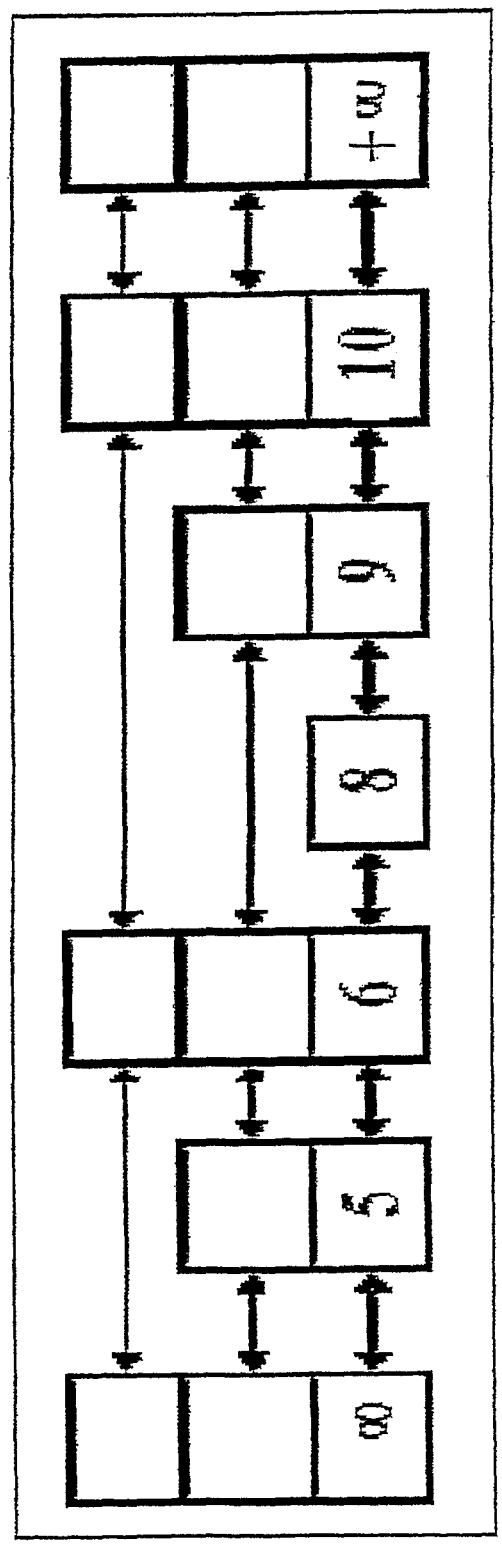
FIG. 3 represents a diagram which illustrates a skip list example.

As can be seen in FIG. 3, in the skip list S the list $S_o$ is placed at the bottom and above it the lists $S_0, \ldots, S_h$ (h is the height of the skip list S).

Intuitively the lists are such that the list $S_{i+1}$ contains more or less the elements contained in $S_i$. As we shall see further on in the insertion, the elements of $S_{i+1}$ are chosen at random from the elements of $S_i$; we flip a coin for each element of $S_i$ and place this element in the list $S_{i+1}$ if it comes up heads.

In this way we should have in $S_1$ a number of elements roughly equal to n/2, in $S_2$ n/4 elements, and so on; generalising, in $S_i$ we will have $n/2^i$ elements. In other words we expect the height h of S to be equal to log n.

Using the abstraction on the position used for trees and lists, we can see a skip list as a two-dimensional collection of positions organised horizontally in levels and vertically in towers. Each level is a list $S_i$ and each tower contains positions that contain the same element via consecutive lists. The positions in a skip list can be traversed using the following operations:

Next (p): returns the position next to p on the same level;
Previous (p): returns the position previous to p on the same level;
Down (p): returns the element in the position below p in the same tower;
Up (p): returns the element in the position above p in the same tower.

It is assumed that by convention the above operations return null if the position requested does not exist. Without going into further detail, it can be noted that a skip list can be easily implemented via the use of a connected structure, so that the above methods obtain a complexity equal to O(1), given the position p in the skip list.

A connected structure, structured in this way, is essentially a collection of h lists double-connected and aligned in towers, which are also double-connected lists.

Commutative Hash

An important element of architectural simplification is introduced via the use of a commutative hash.

The hash function generally takes two arguments, x and y, returning as the result h(x;y), which will be represented by a fixed number k of bits (for example 128).

Intuitively h(x;y) is the hash of the pair (x;y); it is still possible, however, to use the hash function to validate a polynomial with three components (x,y;z), like h(x;h(y;z)). With the same criterion it is possible to use h to perform the hash on longer sequences, for example $(x_1; X_2; \ldots; x_m)$ can be calculated as:

$$h(x_1; h(x_2; \ldots h(x_{m-2}; h(x_{m-1}; x_m)) \ldots ))$$

The verification process which the user must perform to check a value in the database can be simplified by a commutative hash function introduced by Goodrich and Tamassia (cited above). A hash function is defined commutative if the hash h(x,y) is equal to h(y,x) for each x and y. This assertion involves a modification in the meaning of collision-resistant, since h(x,y)=h(y,x) is normally considered a collision. The concept of commutatively collision-resistant is therefore introduced if, given (a; b), it is difficult to calculate a pair (c; d) so that h (a; b)=h (c; d) since (a; b)≠(c; d) and (a; b)≠(d; c).

Starting from a hash function h, which is normally collision-resistant, it is possible to construct a commutatively resistant function:

$$h'(x,y)=h(\min\{x,y\},\max\{x,y\})$$

This function is clearly commutative. Its resistance to collision can be shown by hypothesising, without loss of generality, a<b; if it is possible to find a pair (c; d) that can be calculated for h, then this implies, by means of a simple reduction, that it is possible to find numbers c and d so that h (a; b)=h (c; d) with (a; b)≠(c; d) or h (a; b)=h (d; c) with (a; b)≠(c; d).

In both cases there will be a collision in the normal cryptographic sense. Therefore, if h is collision-resistant in the classic sense, then h' is also collision-resistant.

This simplification facilitates calculation of the root path and, above all, makes it less complex.

Authenticated Skip Lists

The authenticated skip lists are described in detail by Goodrich and Tamassia in (*Algorithm Design: Foundations, Analysis, and Internet Examples*; Michael T. Goodrich, Roberto Tamassia, 2001) as data structures for building the authenticated dictionaries. An authenticated skip list consists of a skip list in which each node v contains a label calculated by accumulating the elements of the set and using a commutative cryptographic hash function h. In this context, the term tower takes on a slightly different meaning from the one in the rest of the text, in particular:

tower node: indicates a node which has other levels above with the same key, while normally it identifies the set of levels that share the same key;

plateau node: indicates a node that does not have other levels above with the same key.

For each node v a label f(v) is defined in terms of the respective values in the nodes w=right(v) and u=left(v).

If right(v)=null, then we define f(v)=0. The definition of f(v), generally speaking, depends on the possibility of u existing or not for the node v.

1. u=null, i.e. v is at the base level:
   if w is a tower node, then f(v)=h(elem(v),elem(w));
   if w is a plateau node, then f(v)=h(elem(v), f(w)).
2. u≠null, i.e. v is not at base level:
   if w is a tower node, then f(v)=f(u);
   if w is a plateau node, then f(v)=h(f(u), f(w)).

Figure 2:
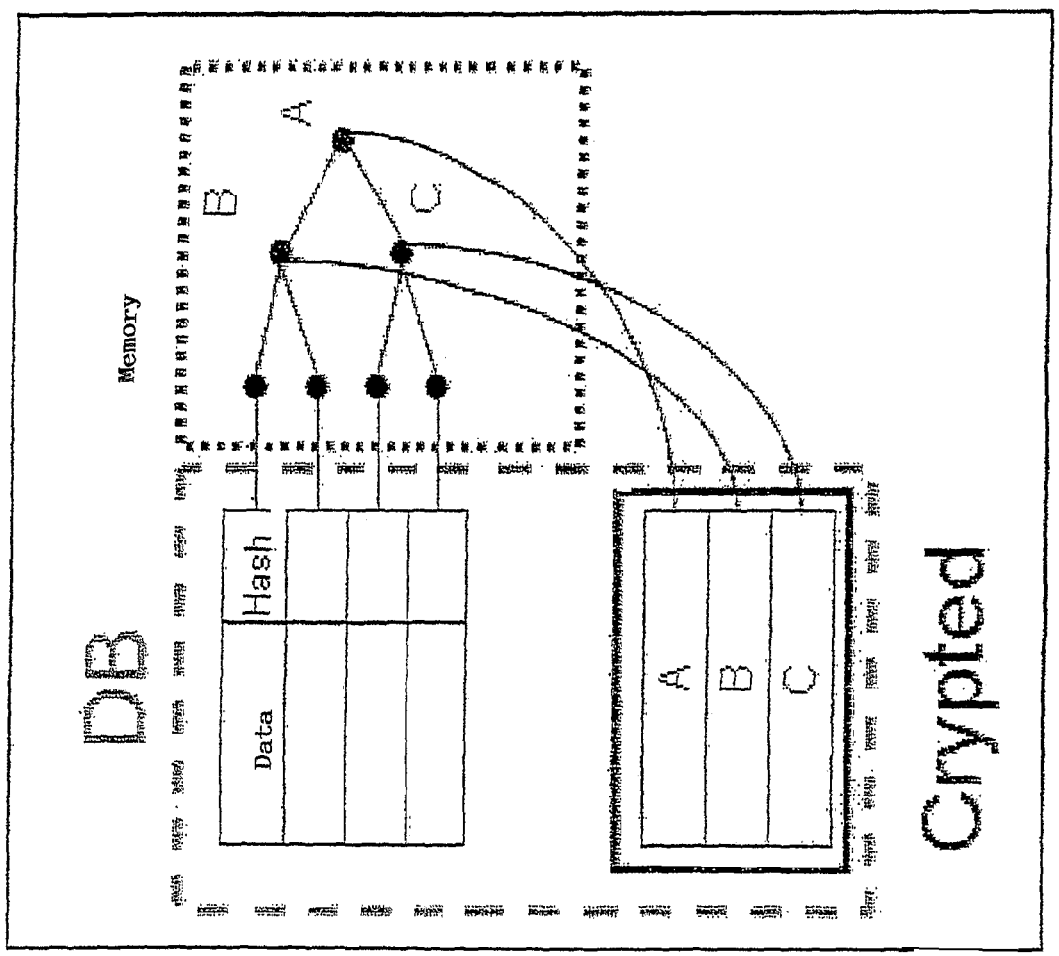
FIG. 2 represents a diagram of the architecture of an authenticated table within a database.

The computation flow of the hash values that label the nodes of the skip list is illustrated in FIG. 2 by a continuous line; it should be noted that the computational flow defines a directed acyclic graph, not a tree.

After updating the nodes of the skip list, the hash values must be updated to reflect the change that has taken place. The additional computational cost required for this operation is, with a high probability, O (log n).

Verification of the response given to a query is simple thanks to the use of a commutative hash function. It should be remembered that the objective is to produce a verification of whether a given element x is contained in the skip list or not.

If the element x is contained in the skip list, the presence of the element itself is verified; if not, the presence of two elements x' and x" is verified, contained in two consecutive nodes at the base level $S_0$, to which the relation x'<x<x" applies. In both cases, the response containing the information on the authentication is a sequence of values and is joined to the hash f(s) of the initial node (basis), provided with mark and time marker.

Let $P(x)=(v_1, \ldots, v_m)$ be the sequence of nodes visited when performing the search for the element x, in inverse order. It can be noted that, due to the properties of the skip lists, the measurement m of the sequence P(x) is, with a high probability, O(log n).

The sequence $Q(x)$ $(y_1, \ldots y_m)$ is constructed from the sequence P(x) such that:

$$y_m=f(s) \text{ is the label of the initial node.}$$

$$y_m=h(y_{m-1},h(y_{m-2},h(\ldots,y_1)\ldots)).$$

Calculation of the sequence P(x) can be performed by inserting in a stack the nodes visited while searching for the element x. When the search is completed, the stack contains the nodes of P(x) ordered from top to bottom. Using this stack, it is easy to construct the sequence Q(x) of the node labels.

The user can verify the response for the element x by simply performing hashing of the values of the returned sequence Q(x) in the given order, and comparing the result obtained with the value f (s) (basis), in which s is the initial node of the skip list. If the two values coincide, the user is sure of the validity of the response given by the time marker.

Characteristics of an Authenticated Table in a Database

Authentication of a single element permits verification that the element has not been modified. With this technique, it is not possible to know directly whether modifications have been made at the level of the entire table, since only the validity of one element can be verified by means of the cryptographic key. Via an authenticated table (authenticated data structure), on the other hand, it is possible to know, by simple verification of one single element, whether the entire table has undergone alterations. The property shown permits insertion of a security scheme in the data structure so that this characteristic is propagated to or inherited by any operation performed by means of this structure.

One of the biggest problems was to find a model to permit interaction between an authenticated skip list and a table in a database. The idea was to add a superstructure to the table for authentication. This superstructure would then be stored in the database itself and in particular in an external table, which can be encrypted to guarantee greater security. The idea is that users can use the database normally and if they wish to verify the authenticity of a data item, they can request it from a specific function which will authenticate the information requested.

The next question is: which fields can be authenticated? In this regard the architecture is fairly free, since a superstructure can be built at various levels:

authentication at the level of an element: a skip list is constructed for each field of the table, plus a further skip list to authenticate the entire record; this is the safest but also the most laborious method, due both to the space required and the computational complexity;

authentication at the level of a record: a skip list is constructed to authenticate the entire record starting from the value of the hash calculated by accumulating all the elements belonging to the record.

Below, reference will be made to the elements that characterise an authenticated table, allowing complete freedom as regards whether to use them to authenticate a record or a single element.

In the project, different approaches were adopted in development of the work; fundamentally, they reflect two development strategies for assessing different aspects of the architecture. A first approach was based on simplicity: the objective was to focus on rapid realisation of an operating architecture, in order to test its effectiveness rather than placing the emphasis on optimisation. A second approach was based on optimisation of the architecture to obtain enhanced performance; here we tried to reduce the slowdowns, due mainly to the method of representation of a hierarchical data structure within a database. Numerous design decisions were taken in both the approaches examined, made necessary by the presence of various problems due to the use of techniques from very distant areas; the main problems encountered will be illustrated below.

The Problem of Representation of the Skip Lists in Memory

The skip list represents a data structure not particularly widely used by developers, like trees or graphs, and for this reason it is not pre-defined in the programming languages. It is therefore important to identify the peculiarities that distinguish this data structure, in order to determine what type of pre-defined data structure it is necessary to extend to obtain good performance. One of the main needs is to maintain the set ordered to allow updates to be made in the data structure.

The structural need to rapidly access the elements present in memory, previous or subsequent to the element in question, inevitably entails the use of ordered data structures, which means that the updates must be made maintaining the order of the data.

These structures provide improved performance, since they allow searches to be carried out with dichotomic type algorithms and therefore with a logarithmic complexity $O(\ln n)$ better than the linear complexity $O(n)$, typical of the exhaustive searches in non-ordered sets.

Furthermore, for each level the skip list requires a reference to the previous element and to the next element with respect to the one in question. For software development purposes, this requirement translates into the need to access via a key (usually the value of an element) the information concerning the current level and the nearby elements (siblings) while always remaining on the same level.

The maps or tables with index provide an excellent response to this need and are preferable with respect to use of the data structures based on sets, i.e. tables without index. The data structure that can best provide a valid representation of a skip list in memory is a map, which maintains the set of elements ordered during the update operations.

The Problem of Representation of the Skip Lists in a Database Table

A very different problem from the previous one is the representation of a skip list in a relational database table stored in secondary memory. Normally the authenticated data structures are hierarchical, a characteristic that does not mix well with the use of relational databases; in fact, to access the data in a database, a large number of queries have to be made which lead to a considerable increase in the times required for the various operations.

The problem of the representation of hierarchical sets in relational tables is more general and involves representation of the XML schemes in the databases. Numerous attempts at adaptation between hierarchical data structures and relational tables have been made, without ever fully solving the problem.

The Importance of Granularity in Representing a Skip List

Figure 4:
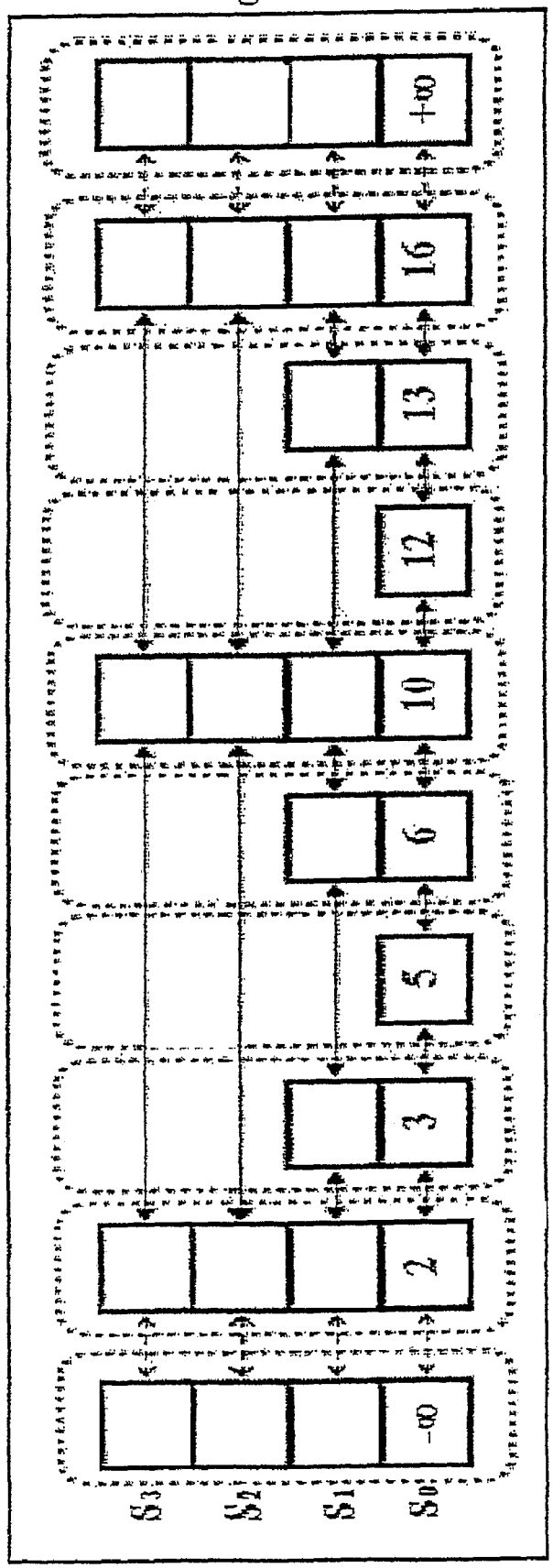
FIG. 4 shows a diagram illustrating a skip list with coarse-grained approach.

The granularity in a skip list represents the problem of the level of detail to adopt to identify the atomic level: an entire "tower" or a level of a tower. This small difference entails a big difference at the level of the architecture, since in the representation of a skip list in a table, two different paths can be followed:

1. Coarse-grained using a record to represent each tower in a skip list; FIG. 4 shows, via the broken line, the division of the skip list into records and the dimension represents the space actually occupied in the relational table.

Figure 6:
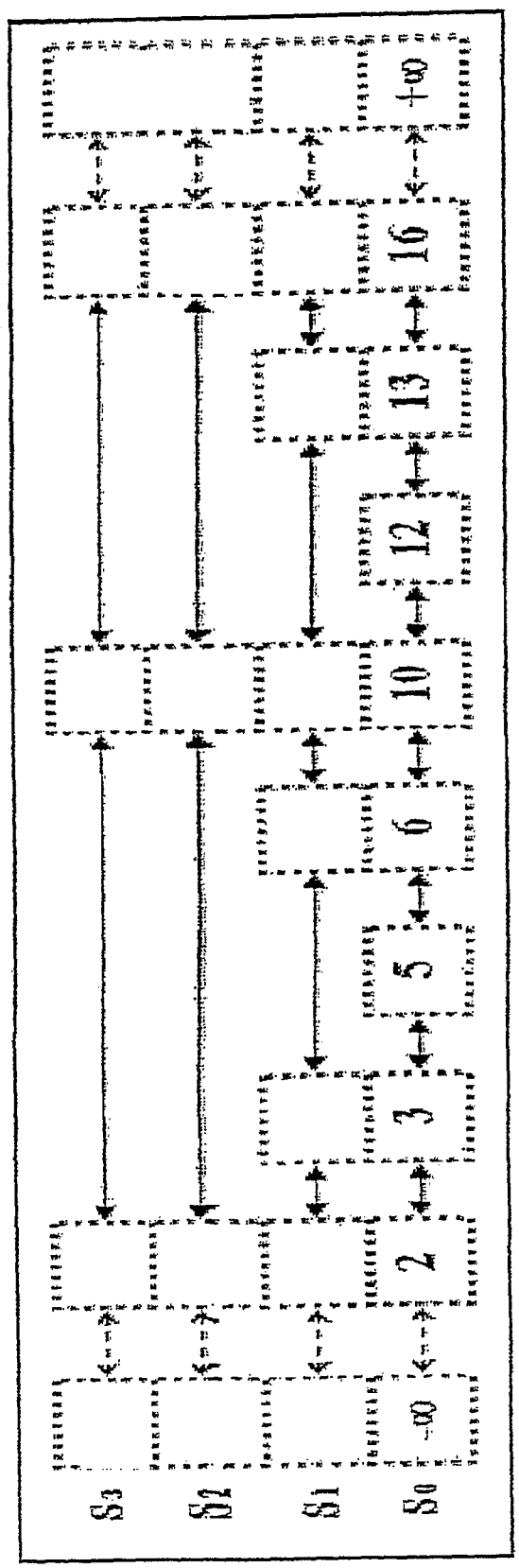
FIG. 6 represents a diagram illustrating a skip list with fine-grained approach.

2. Fine-grained using a record to represent each individual element of the tower at different levels; FIG. 6 shows, via the dotted line, the division of the skip list into records and each level of a tower represents a record.

The two approaches will have profound architectural consequences; in fact, they will be highlighted in the analysis of the primitives. The finer-grained approach permits use of the technique introduced by Joe Celko (Joe Celko. *Joe Celko's Trees and hierarchies in SQL for smarties*. MORGAN-KAUFMANN, 2004), which allows for considerable optimisation in the management of hierarchical structures in a relational table. Said technique will be illustrated in the section relative to analysis of the research primitive.

Primitives Analysed

Application of the techniques of the authenticated data structure world to the highest possible number of primitives of the database world formed the basis of the project carried out. For said purpose, the main primitives of the databases were analysed, in an attempt to implement a real authenticated database.

The primitive necessary to create a table does not entail particular modifications to the structure of the primitive, but requires the creation of additional columns for maintenance and management of the authenticated data structure. These additional fields maintain the hash information and references to the previous or next fields on the same level. The fields to be inserted vary depending on the approach followed, and therefore the granularity adopted.

If the tower of a skip list is used as a minimum element, creation of the table must take account of the presence of towers with a different number of levels and, as often happens in databases, we have to adapt to the worst case, i.e. the highest tower. Adapting to the highest tower entails insertion of the null value in the table, to fill all the levels of the towers that do not have maximum height.

This approach involves a large number of empty cells, since, as has already been explained in detail in presentation of the data structure, the height of the towers is determined at random, but with a logarithmic probability that tries to limit the number of towers of maximum level. The coarse granularity presents a number of records equal to the number of elements (towers) in the skip list. As an example, we take a skip list with only three height levels, represented in the figure; it can be seen that in this example, there are very few towers with maximum height, excluding the elements that are at the extremes.

Its representation in table form can be seen in FIG. 5, in which:

Key represents the value of an element of the skip list which can also be a non-numerical element; what matters is that an ordering criterion can be used;

Prv n and Nxt n represent the previous and next elements, at the nth level, of the element in question;

Hash n (element not shown in the figure) represents the hash of the nth level calculated according to the general authentication mechanism.

The representation of a skip list in a table with coarse granularity is very similar to a skip list rotated by one quarter in clockwise direction. This representation has the advantage of permitting, via a rapid visual inspection, the presence of errors in the structure; it was very useful in development.

Choosing a finer granularity, i.e. choosing as atomic element a single level of a tower, certainly entails a reduction in the space occupied. Said reduction is made possible by no longer having to represent the empty levels, since it is no longer necessary to adapt all the towers to the highest one, as it was in the previous representation; now, in fact, the smallest element is the single level of a tower, while those that represented the empty levels will not be represented.

The number of records present in the table will be greater as there will be several elements with the same value, since they will belong to the same tower and will differ due to the level of the tower at which they are located. The presence of several elements with the same value makes it necessary to use a multiple key which comprises the value of the element plus the level.

In the table of FIG. 7 which represents the skip list of FIG. 3, in the fine-grained representation, the fields inside the table represent:

Key: the value of the element that characterises a tower in a skip list.
Level: the level of the tower; this element is very useful because it can be coupled with a field: Key, prvKey or nxtKey, to create the multiple key (value, level) to implement the root path within the skip list.
prvKey, nxtKey: the values previous and next to the level in question, necessarily coupled with the level to find the siblings in order to move around the skip list.
parentLvl, parentKey: multiple key that represents the element preceding the element in question; it is necessary for calculating the root path in an authenticated skip list.
hash: the hash values necessary for the authentication calculated with the rules of the authenticated skip lists.

Searching for and Verifying an Element

This primitive is the one that poses fewest problems, as it is related to the procedures used in the dictionaries authenticated by Goodrich and Tamassia (supra). The search primitive consists in a simple verification that a single value belongs to a database. A distinction must be made in the use of this primitive according to the result returned; in fact, depending on whether the value is present or not within the database, different procedures must be performed to validate the response obtained. Authentication of the non-presence of a data item will be subsequently illustrated in a purposely-dedicated section.

In verifying whether an element is present in a skip list, if the data item is present, the system must calculate the path that starts from the element found at the lowest level and arrives at the root on the extreme left at the highest level. The root path in a skip list is illustrated below; in FIG. 8 the following conventions are used:

the continuous line indicates the elements traversed to authenticate the element, also called root path;
the dotted line indicates the elements not involved in the validation process;
the dash-dot line indicates the elements traversed indirectly, i.e. the elements that have not been traversed but the content of which is necessary for calculation of the hash.

Overhead for Verification: Comparing the Two Granularities

The root path found for a certain value must be verified in order to authenticate it. To verify this path, a table containing the elements that permit reconstruction of the root path must be received from the database. According to the granularity chosen, this table will have a different number of components; below, two figures are shown which illustrate the different composition of the tables.

The table in FIG. 10 represents the coarse-grained approach and shows the elements necessary for the authentication process in solid black while the elements loaded in memory, but not useful, are in grey. These grey elements constitute a structural overhead to the validation process, i.e. they are elements that cannot be filtered using this approach.

A second approach is to use a fine-grained table to store the data. Said table, as in the preceding example, shows the elements necessary for the authentication process in solid black while the elements loaded in memory but not useful are in grey.

As can be easily seen, also with the second approach there is an overhead, since some values inside the single element are not used. The use of an even finer granularity has not been analysed in depth, as it presents great difficulties from the point of view of management of the references present inside a skip list.

Comparison between the two approaches certainly makes the adoption of a finer granularity more interesting. This approach involves an increase in the number of records which the table has to manage with respect to the coarse-grained approach, in which the records are exactly equal to the number of towers present in the skip list.

Since the skip list is a random data structure, an average case is taken into consideration; also by the observation of experimental results, it can be seen that in reality the number of additional records, for the fine-grained case, is a high but not significant percentage in terms of performance. Therefore the second approach is preferable to the first, at least due to the considerable amount of space saved for very large tables.

Both approaches will be presented in the chapter on realisation of the project.

Authentication Scheme for a Query

The tools AuthenticResponse and Basis are relative to the queries. A schematic interaction diagram for authentication of the query system is given below; its main methods are:

AuthenticResponse Query(Object O): checks the presence of an element and returns an AuthenticResponse type object.
Basis getBasis( ): requests the basis object receiving the information to carry out the authentication.

The verificaBasis( ) method verifies that the Basis is signed by the certification authority CA.

An AuthenticResponse instance has two methods, one to identify the element of the query for which the response is issued, and another to determine whether an element is contained or not in the database table. There is a further method, called Validation, which serves to determine whether the response is valid and takes a Basis type object as its parameter.

The user should be sure of the response concerning the object database membership query from verification of the following pre-conditions:

1. The user is confident that the data contained in the Basis instance have not been altered as it has been signed by the certification authority CA.
2 The user is confident that the code run by the AuthenticResponse methods has not been altered, as it has been signed by the certification authority CA.
3 The Validation method returns true.

The validation method recalculates the root label via hashing of the labels in the sequence in the appropriate order, and compares the value thus obtained with the one returned by basis. The data represented by the Basis and AuthenticResponse objects depend on implementation in the skip list data structure:

the Basis object: this is the label of the element with maximum value on the extreme left;
the AuthenticResponse object: contains the sequence of values for an element of a set in order to calculate the root path.

Verification of an Element not Present in a Skip List

Figure 12:
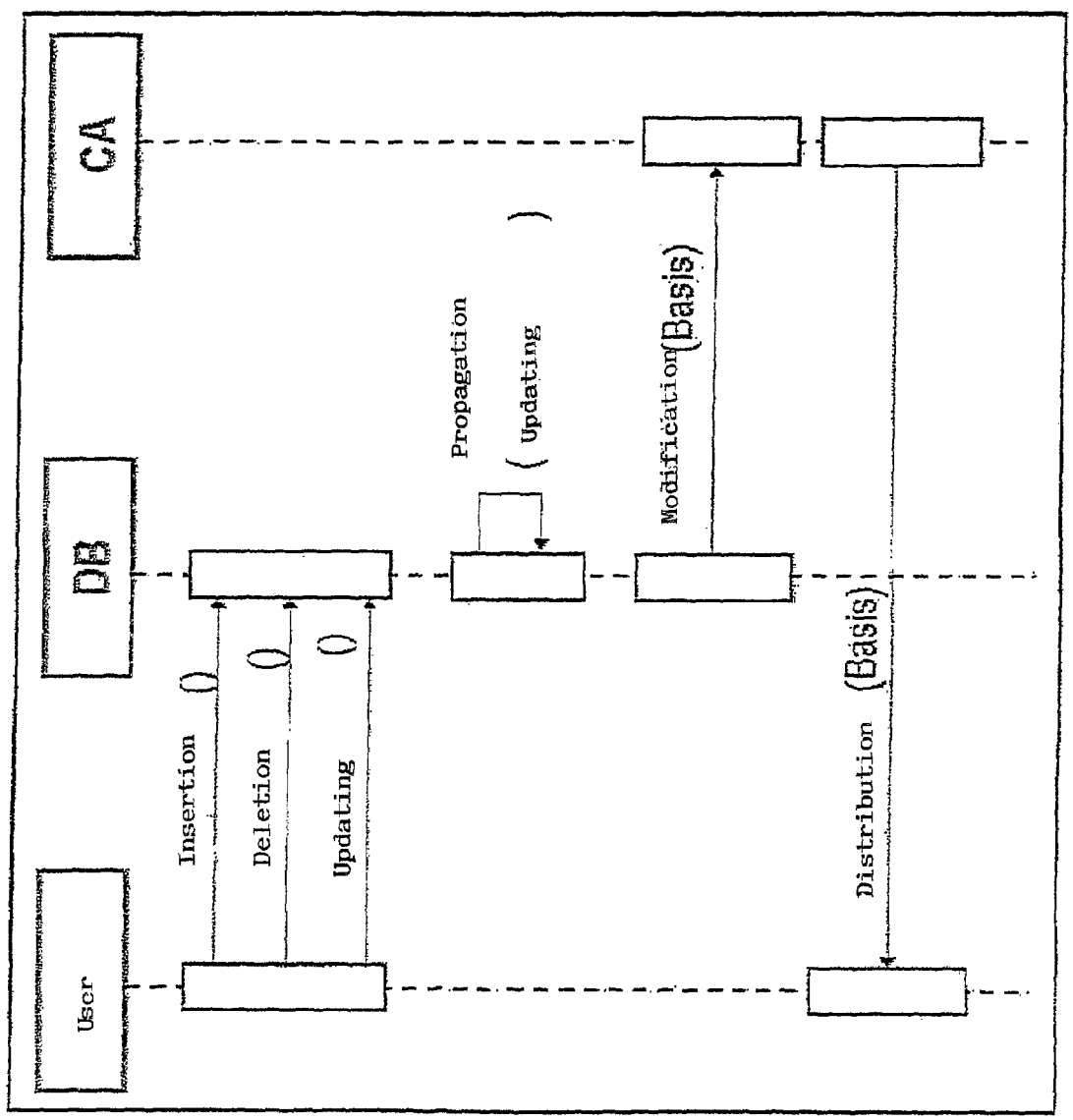
FIG. 12 is an interaction diagram for the modification of an element in an authenticated table.

Verification of the non-presence of an element within a skip list can be obtained by verification of the two adjacent elements. In fact, by verifying the previous and next element in the skip list, it is possible to certify the absence of an element, thanks to the fact that the set to be authenticated must obligatorily be kept ordered. FIG. 12 shows the technique for certifying the absence of the element with key 8; the root paths for the elements with keys 7 and 9 can be seen.

Authentication of the selection of intervals is analysed since the selection of a single element can be assimilated to the authentication of a search query. The problem can be tackled in two different ways. The first, by simply affirming that it is sufficient to authenticate indiscriminately all the elements returned one at a time. Said approach is not particularly smart, as it does not exploit the possibility, at least for the intervals, of using the skip list characteristic of being an ordered set on one single index.

The second method was introduced by Buldaas, Roos and Willemson (A. Buldas, M. Roos, and J. Willemson. *Undeniable replies for database queries.* 2002) and permits verification of intervals via a quicker procedure, the complexity of which increases only logarithmically with respect to the number of data contained in the interval. The procedure exploits the authentication via the values immediately below and above with respect to the values at the extremes of the interval.

The selection primitive, in addition to authenticating that the data returned all belong to the database, must also authenticate that they are the only ones belonging, i.e. it must be possible to verify that there are no other elements that are not returned. For the single element, this need can be elegantly solved by authentication of the value of the previous and next element, but creates greater problems in the case of intervals. In fact, additional information must be inserted on the number of elements in the structure. An interesting study is that of Nuckells, Martell, Stubblebine in [NMS], which introduces the concept of Count Certified Search Tree, as a system to make the digest more secure (the result of a hash operation) with respect to the Merkle tree. The underlying idea is that of inserting a value, count, that takes account of the number of elements below from a hierarchical point of view, plus a split, which indicates the direction.

Calculation of the digest is performed by using the following formula:

$$\text{Digest}(v)=H(\text{Split}(v),\text{Count}(u),\text{Count}(w),\text{Digest}(u),\text{Digest}(w))$$

Count (v) number of elements stored in the leaves of the sub-tree with root in v.
Split (v) value to decide the direction.
Digest (v) value of the coding.
H( ) collision-resistant hash function.

Substantially it adds the information on the number of elements hierarchically below, in calculation of the hash function.

This system is based on the binary trees, but can be extended with various precautions to the skip lists. An alternative approach could be to construct an authenticated dictionary [GT00] in which to store, for each element, the number of times it is repeated, then authenticate it and maintain it synchronised with the database. The latter is simple to achieve but entails synchronisation management problems.

Insertion, Deletion and Updating

The insertion, deletion and updating primitives represent the data structure modification primitives. The use of said primitives permits dynamic management of the authenticated table; in fact, due to the primitives it is possible to modify the data, maintaining the data structure secure.

Only insertion of a value in an authenticated table will be analysed in detail, since the data deletion and updating procedures can be easily derived from the insertion procedures.

Figure 13:
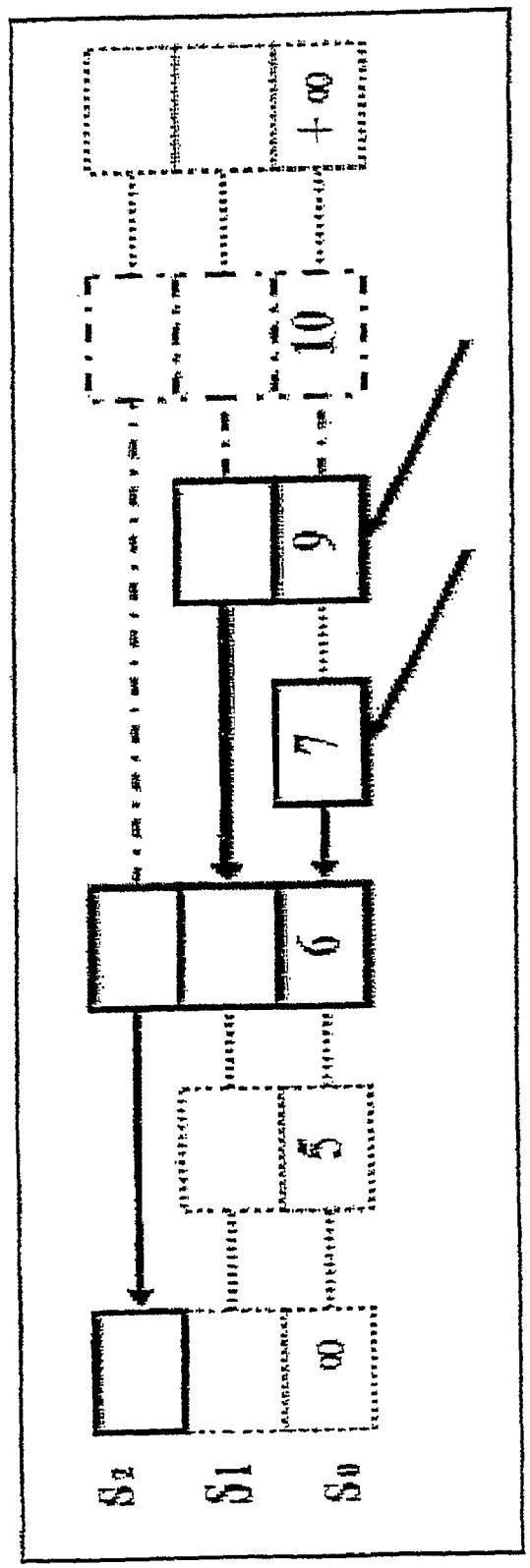
FIG. 13 is a representation of the path for certifying the absence of the value 8.

The diagram shown in FIG. 13, of interaction for the modification of a table, describes the updates to the authenticated table.

The architecture allows an authorised user to add and remove elements to and from the database; to do this, the following methods are available: insertion, deletion and update. All the methods have one single parameter, the element, and return an object.

The Update object is used to spread information within the table. The Update function contains the run method that performs the update on the table, which can be one single insertion/removal operation or a sequence of them.

It is assumed that a transport mechanism exists which distributes Update objects and the associated Basis objects to the user.

It should be noted that the methods getBasis( ) and distribute( ) are not part of the interfaces discussed above.

Given that the set of the implementations of the authenticated tables can be restricted to the types of data that can be contained in the tables, the insertion, deletion and update methods could generate objections if the user tries to insert incompatible data.

If a user does not receive the update flow in the order in which it has been generated by the database, it can raise objections depending on the specific implementation.

The join primitive represents the biggest obstacle to the realisation of a database using these techniques; in fact, execution of the join does not allow the properties of the authenticated data structure to be maintained. The only way of authenticating a join is to authenticate its various constituent elements, according to the following scheme:
1. An ADS should be added for each field of the DB, in order to certify the data present in the field.
2. Perform the JOIN on the hashes present in the fields of the respective tables.
3. Create a new table consisting of:
   the records identified by the join and verified by ADS;
   the hash for each record H ($H_A$, $H_B$), with:
   $H_A$=hash of the record of table A
   $H_B$=hash of the record of table B
4. The new table created should then be authenticated.

Dynamic Management of an Authenticated Table

In the normal use of a database, numerous search operations are performed and also insertion and deletion operations. These operations involve modification of the authentication superstructures each time, in addition to the table in which they are located in the database, to maintain the integrity of the authenticated table.

All the primitives, as shown previously, provide for interaction between the application developed and the database, with the need to retrieve a greater number of data from the database to manage the authentication. This need can be met by various methods, according to the table dimensions and the consultation and modification frequency.

The possible techniques for loading the authentication structure in memory differ according to the number of elements to be loaded or which it is possible to load. The analysis illustrated in the following paragraphs has been performed starting from loading of the entire table in memory right through to loading one single element at a time.

As will be seen in the section on the tests, the database access operation is the most laborious, since, generally speaking, it consists in a secondary memory access operation.

Management of Entire Table in Memory

Management of the entire table in memory was the first path explored; it presents numerous advantages and is simple to realise but poses technological and performance problems in interaction with the database. In response to a user query on the table, this method can be schematised in the following steps:

1. loading of all the table requested in memory;
2. verification of validity of the data item;
3. execution of the modification operation;
4. validation of the data item;
5. re-insertion of the entire table in the database.

In the case of a simple verification query, only the first two steps will be used. The practicability of this approach is inversely proportional to the increase in dimensions of the table; in fact, while it is possible for a small table, a very large table would encounter difficulty in use of this method.

Loading of the entire table in memory has the advantage that the authenticity of the entire table can be reconstructed. This operation can be performed starting from the values of the elements present in the table and from knowledge of the details of the skip list (levels of the towers). In this way an excellent level of security is obtained, because there is no need to refer to the hash data among the various elements saved in the table. Obviously this increase in security results in an increase in the computational burden, which makes this approach unfeasible.

Re-insertion of the modified table involves a greater complexity than loading it, since generally in the context of database connection tools, techniques for inserting an entire table in the database do not exist other than insertion one line at a time.

Management Via Direct Access to the Database

This method is diametrically opposed to the technique presented previously. It uses the possibility of directly accessing a table in a database, making a query whenever a data item is required.

This approach offers the interesting possibility of using the authenticated databases in devices with very limited internal memory (handheld computers, smartphones . . . ). Practical implementation of the method is difficult given the need to scan a hierarchical data structure to construct the root path; there would be a substantial number of elements to be used and a consequent number of queries.

Management of a Part of the Table in Memory

A third method consists in managing only a part of the table in memory, trying to find a useful compromise with techniques presented previously. The idea underlying this technique is that of trying to obtain from the database only the data necessary for authentication, hypothetically by means of one single query, the result of which is the root path.

With this approach, only a modest number of elements have to be kept in memory and synchronised with the database, at the same time obtaining acceptable performance. The search for a query which is as efficient as possible and provides the elements necessary for calculating the root path represents a decisive factor for the use of this method.

Techniques for Limiting the Overhead in Selection of the Root Path from the Database Performing a search query in an authenticated table involves the need to recover, in addition to the information searched for, a superstructure for the authentication: the root path. This need implies the search for queries that can obtain the elements necessary for efficient calculation of the authentication path. This path is difficult to locate, as it is shared between the elements; the comparison value for the authentication (basis) is equal for all the elements.

Queries must therefore be searched for which, by means of the values of the keys, can select a number of elements not too far in excess of the number strictly necessary. These elements, which are not part of the verification process, represent a second type of overhead, in addition to the structural one relative to the dimension of the granularity chosen; obviously they must be reduced as far as possible.

Figure 14:
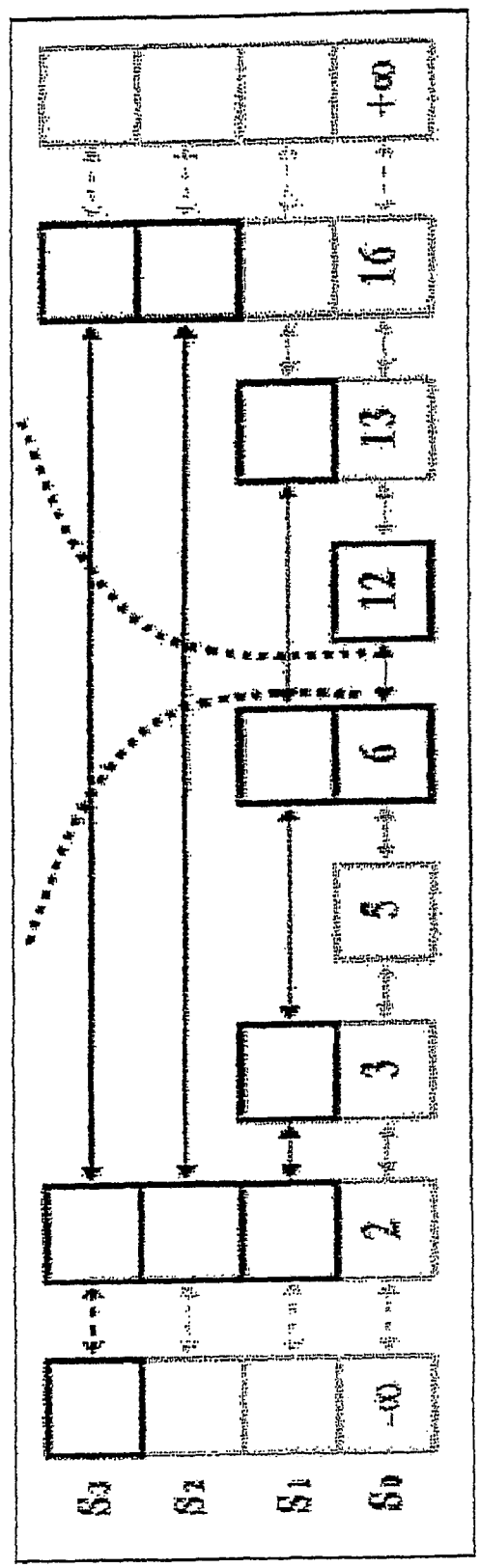
FIG. 14 is a representation of the "funnel" technique to obtain the root path via query.

The granularity chosen involves different techniques to limit the overhead. A coarse granularity has the advantage of loading via each record identified an entire tower of the skip list. This method, which in general involves an overhead due to the excessive number of elements loaded, in this case is advantageous as it loads all the levels simultaneously. The number of queries necessary is directly proportional to the dimensions of the table, as it is linked to the number of levels. The basic idea, as shown in FIG. 14, is that of using a "funnel" technique, thus loading all the elements found:

within the interval between two towers which include the element to be loaded;

in the level below the one in question together with all the maximum level elements with value lower than the selected key.

It should be remembered that all the techniques apply to sets for which it is possible to establish an order, therefore concepts like "bigger" and "smaller" can be used.

In the fine-grained approach, techniques can be adopted analogous to those presented previously; the technique introduced by Celko to represent a hierarchical structure in a database is of particular interest.

Representation of a Hierarchical Data Structure within a Relational Table, Nested Set Technique In his book (Joe Celko. *Joe Celko's Trees and hierarchies in SQL for smarties*. MORGAN-KAUFMANN, 2004) Celko introduces a new technique for tree data structures; the skip lists are not real trees, as they are directed acyclic graphs (DAG), but with some precautions said technique can be used also with this data structure.

Celko uses the concept of nested sets instead of the classic representation with "boxes joined by arrows" to represent the trees. This approach is more practical, as SQL is a set-biased language. We take as an example an organisation chart representing the hierarchy of management and employees in a firm. The first column contains the names of the persons.

| Employee | Left | Right |
|----------|------|-------|
| Antonio  | 1    | 12    |
| Bibi     | 2    | 3     |
| Chiara   | 4    | 11    |
| Daria    | 5    | 6     |
| Enrico   | 7    | 8     |
| Franco   | 9    | 10    |

To represent a tree as a nested set, the boxes are replaced with ovals and then the ovals of the children (smaller) are placed inside those of their parents. The containment represents the subordination. The root will therefore be the largest oval and will contain all the other nodes. The leaf nodes will be the innermost ovals and will not contain anything. In this way the nesting shows the hierarchical relations between the nodes. This is a natural way of modelling a hierarchical set, as the final set consists of nested partial sets which collapse into separate parts. This tree therefore translates into a nesting of sets. Using this technique a tree can be modelled with pairs of numbers (lft,rgt). These pairs of numbers will always contain the pair of subordinate nodes, in this way a child node is always within the limits of its parents.

A way of better understanding the nested set model is to think of a worm with an automatic counter which moves up the tree in its classic graph version. The worm begins from the root and goes right round the tree. When it passes over a node, it deposits a number on the side it is visiting and its counter increases. Each node will contain two numbers, one for the right side and one for the left side; in practice this is a preorder visit with a modification to number the nodes. The numbering of the nodes yields results which we can use to construct the queries.

This type of representation is very useful for calculating the leaf-root path, in fact it is sufficient to perform the following query to calculate Francesca's bosses:
SELECT*
FROM Personnel
WHERE lft<Franco.lft AND rgt>Franco.rgt
Use of the Nested Sets in the Skip Lists The technique of Celko presented above can be applied directly to the trees and not to the directed acyclic graphs (DAG). Applying it to the skip list entails some modifications, in particular some additional queries, to recover all the elements necessary for calculation of the root path.

Figure 15:
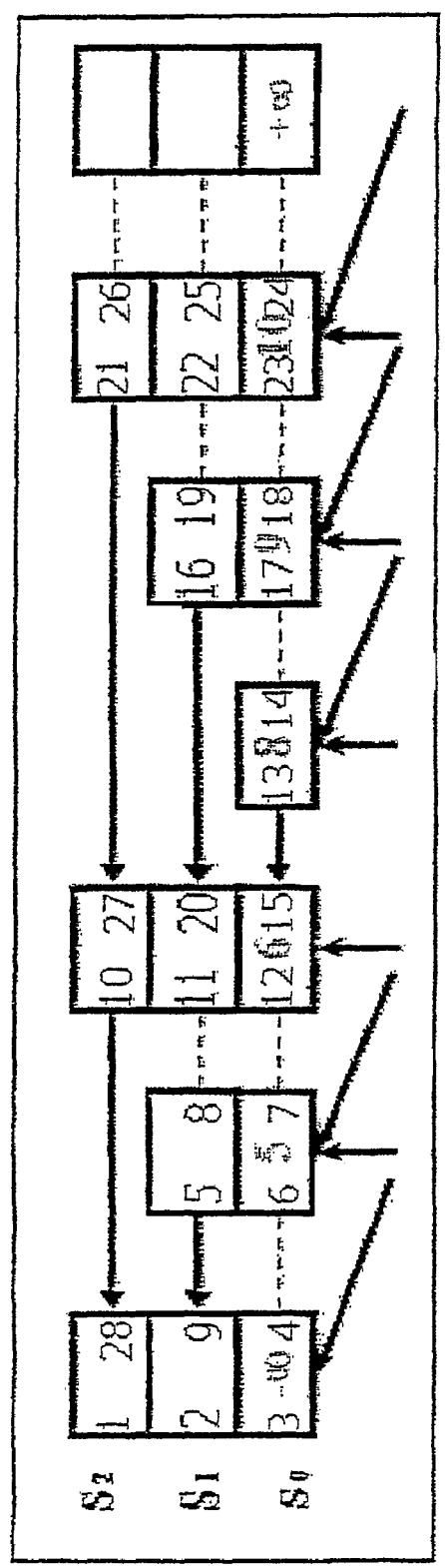
FIG. 15 is a representation of the skip list using the nested set technique.
Figure 17:
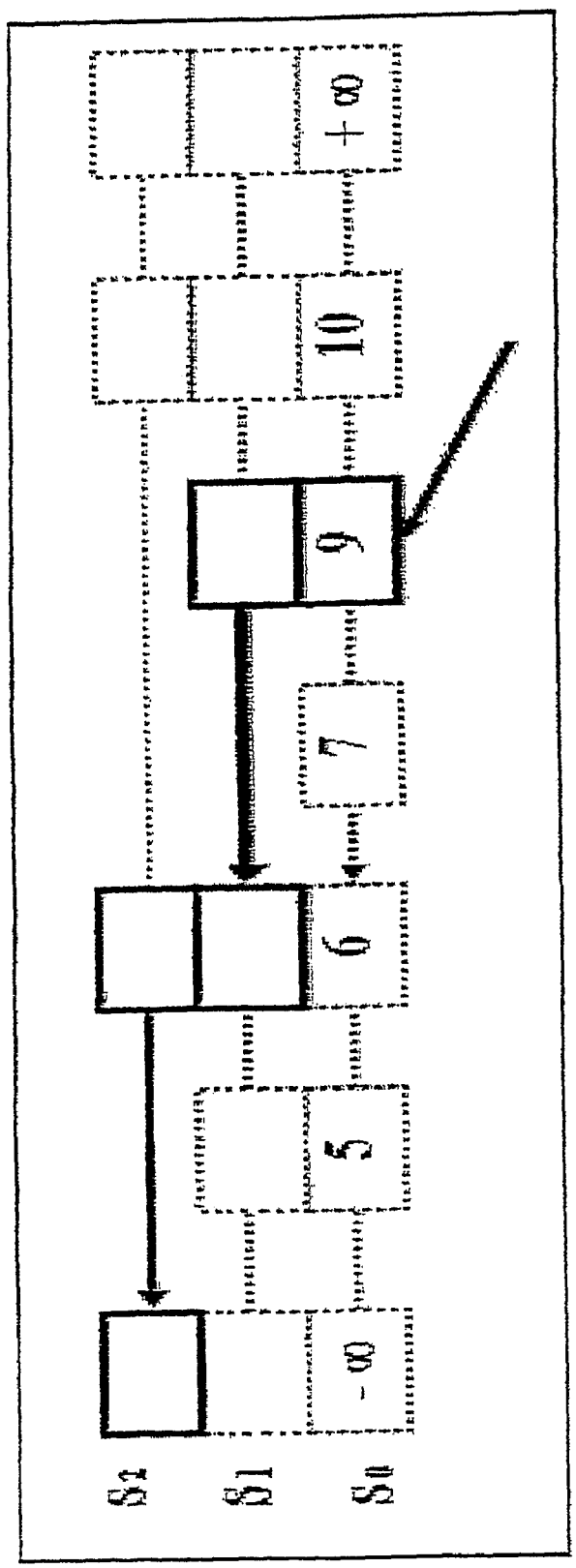
FIG. 17 represents the method for recovery of the root path for verification of the partial element 9 by means of nested set.
Figure 18:
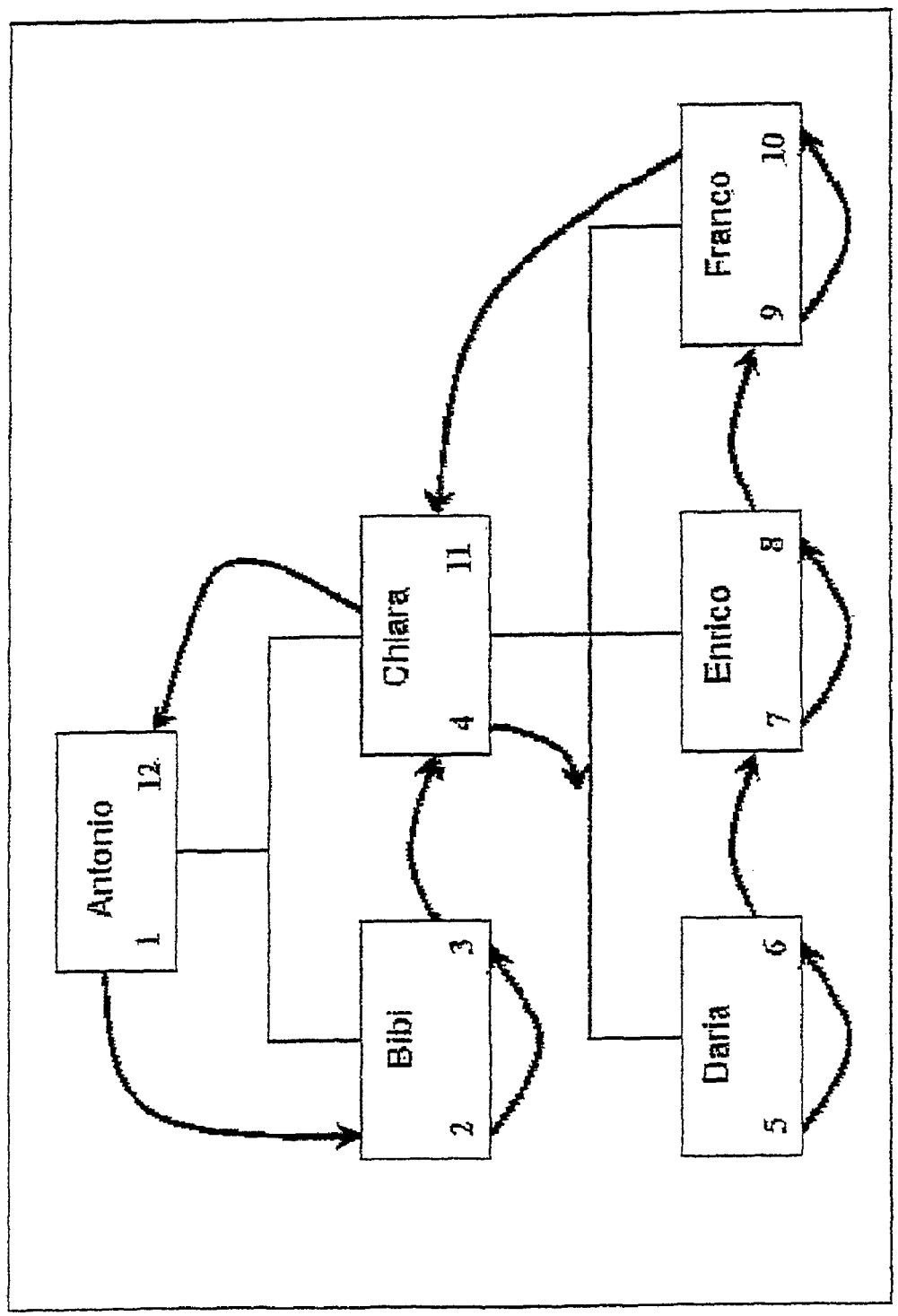
FIG. 18 is a tree traversed with the nested set method.
Figure 19:
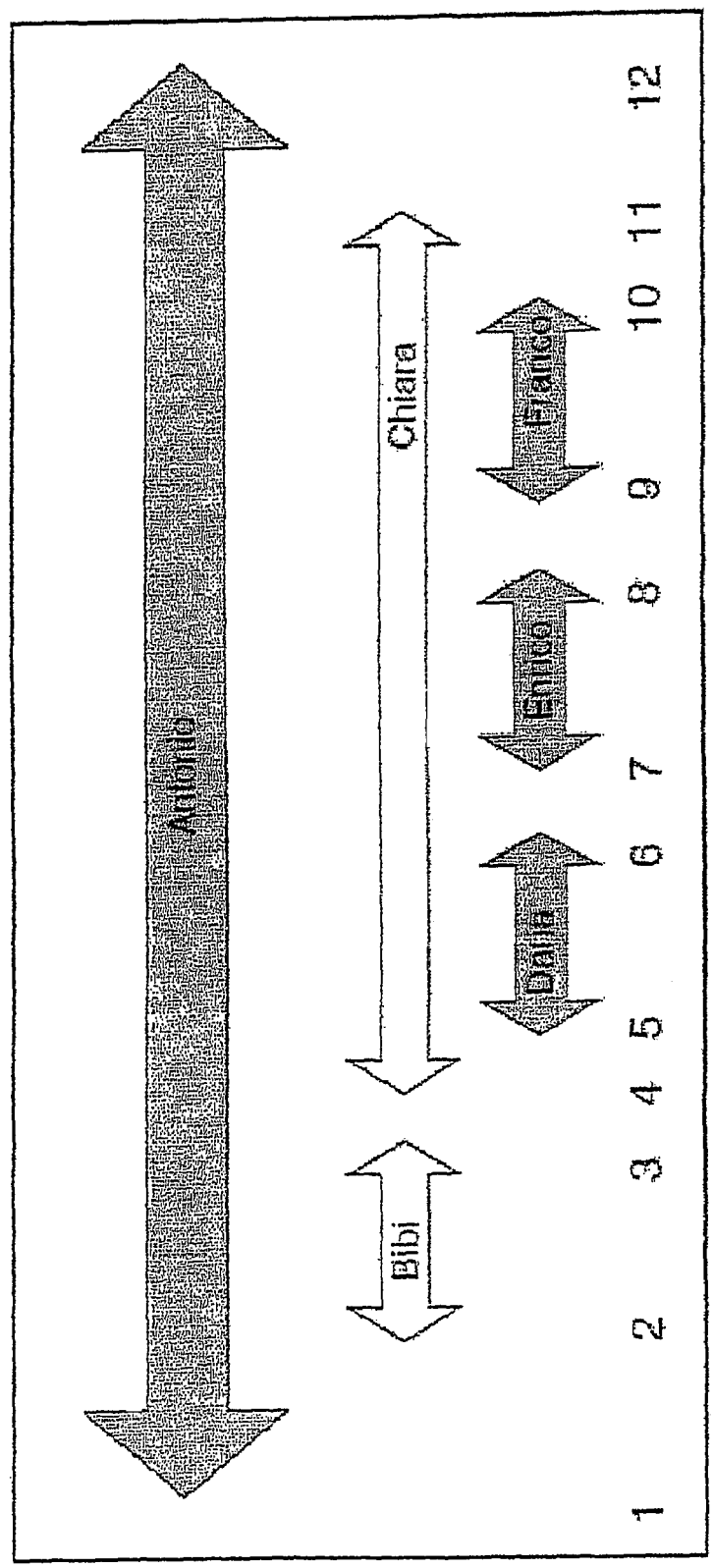
FIG. 19 is a hierarchical table represented by means of lines.

The great advantage of this technique consists in obtaining a method that requires a constant number of queries, regardless of the dimension of the data set contained in the table; it should be remembered that the other approach performed a query for each level of the skip list, as is shown in FIG. 15 by means of a skip list indicating in boldface the numbers for using Celko's technique. FIG. 16 illustrates an explanatory table of a skip list with the left and right elements added.

The table can be obtained in two ways: by conversion from a table already present in the database, by means of the hierarchical relation between the pair (Key, Level) and the pair (parentLvl, parentKey) or constructed dynamically.

Dynamic management permits frequent insertions and deletions in a table, maintaining the hierarchical order (lft rgt); it is described in detail in [Cel04].

The path found for authenticating the element 9, performing the simple query, is therefore:
SELECT*
FROM SkipList
WHERE lft<9 AND rgt>9

Said query returns the root path, indicated by the thicker line in the figure, but not all the elements necessary for performing the hash, like the hash values of the tower with key 10.

Figure 8:
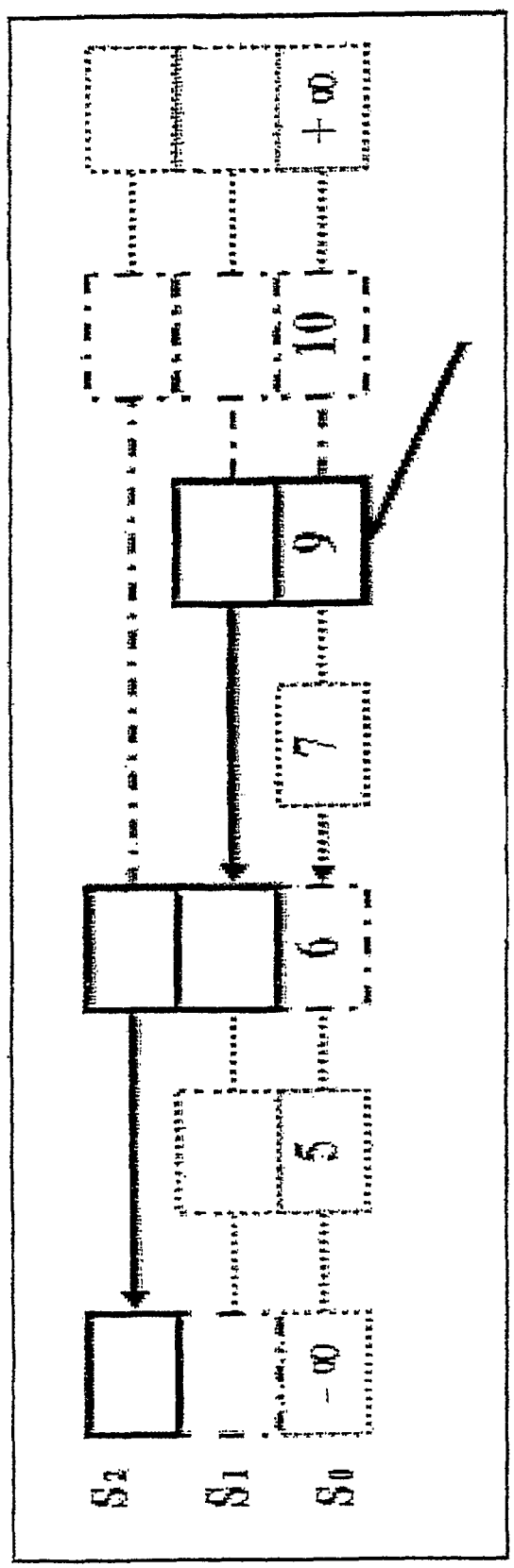
FIG. 8 represents the root path for an element with key 9.
Figure 11:
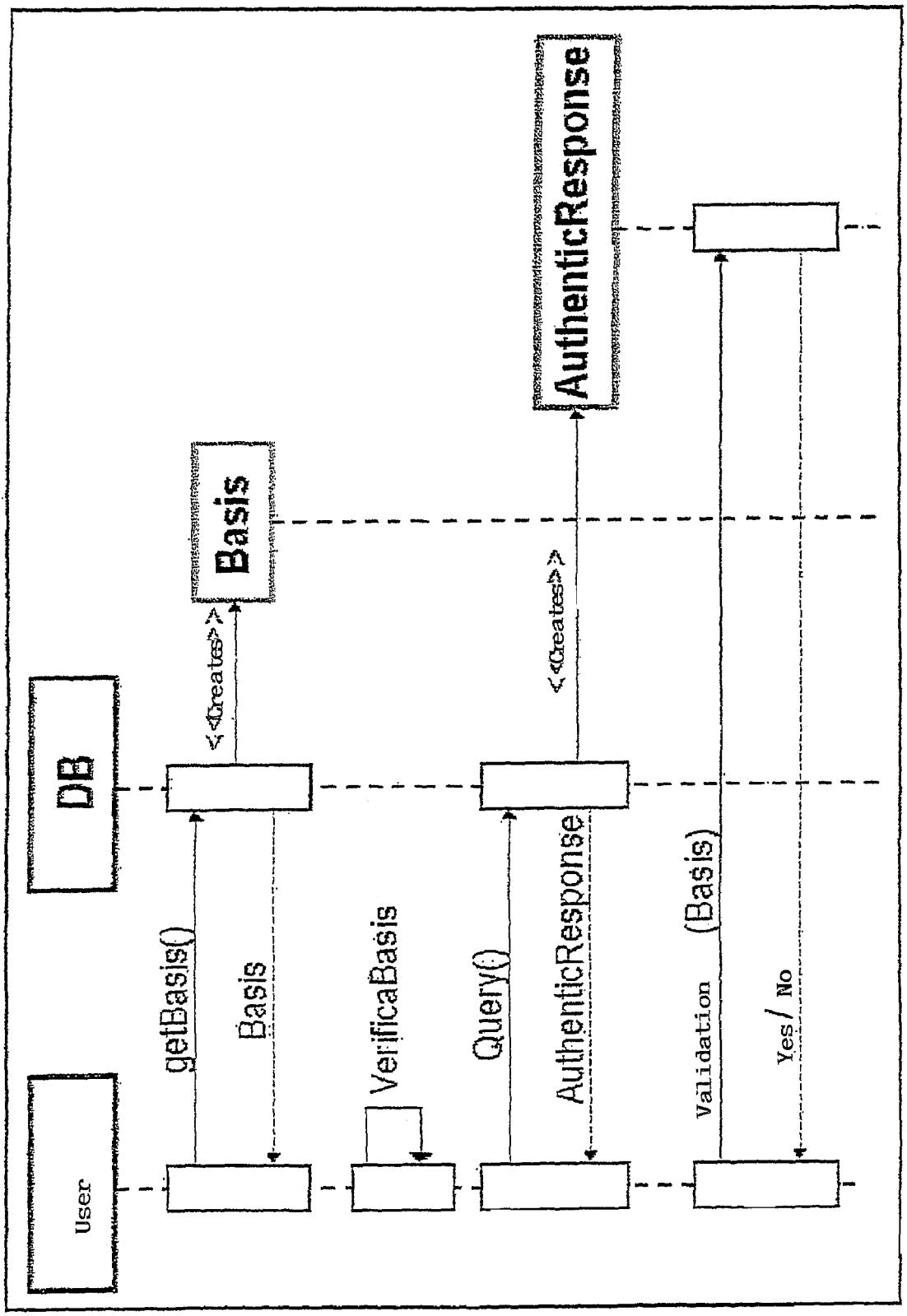
FIG. 11 is an interaction diagram for the authentication of a query.

With reference to FIG. 8, to recover said elements indicated by the dot-dash line a further two queries can be made starting from the data returned by the query to authenticate the element with key 9:
1. by selecting all the elements present in the value of the fields Next;
2. by selecting all the elements with equal key, located at a lower level.

Production of the Prototype

The starting point was to produce an operating prototype of an authenticated table within a database. The lack of back-up material on this topic meant that the project had to be developed with an eye to simplicity, without being able to use previous experiences.

The prototype was produced considering the following characteristics:
Multiplatform: objective achieved using Java as the programming language, which permits use of the same code on different platforms without having to be re-written.
Multidatabase: obtained via DAO (Data Access Object), a programming technique to access different databases without modifying the code.
Indirect interaction between the database and the software: JDBC, Open Database Connector type system to access the database using Java language.
Possibility of maintaining within the same database both the authenticated data structure with the data necessary for the authentication, and the normal data.
Management of the information dynamics within the database.
Possibility of normal operation during consultation of the database.

The prototype was produced by attempting to extend the security tools of the authenticated data structures (ADS) to the largest possible number of primitives belonging to the database. An implementation prototype for the management of an authenticated relational table in a DBMS was developed. Preliminary tests were conducted on the performance of the data structure used, via the analysis of queries for authentication.

The reference language used was Java, which permits direct interaction with the database thanks to the JDBC library.

The reference database was Microsoft SQL Server 2000, as it is equipped with level 4 JDBC drivers which permit optimisation of the database access times.

The machine on which the tests were performed consists of the following hardware components:
CPU AMD Athlon 64 3000+;
memory 1 Gb RAM DDR;
hard disk 5400 rpm.
The following software was used:
Microsoft Windows XP with SP2;
fourth level JDBC drivers developed by Microsoft;
Java 2 version 1.4.2.

The tests carried out were performed on data sets with dimensions increasing from 100000 to 1000000 and involved measurement of the performance for the following areas of interest:
Validation in memory: i.e. the time necessary, once the root path has been loaded in memory, to certify the authenticity of the data item returned.
Time for loading the records in memory: i.e. the time for selecting and loading in memory the elements necessary for constructing the root path.
Towers and steps necessary: i.e. the number of elements (towers) loaded in memory with respect to the number of steps used. It represents a test on the architecture and not a time test.
Insertion of a new element: the tests are presented in two different graphs:
the first graph (illustrated in FIG. 20) represents the time required to load the elements necessary for maintaining security in memory;

the second graph (illustrated in FIG. 22) indicates the time necessary in memory to perform the update and the time necessary to transport the elements from the memory to the database.

All the tests were performed by averaging the results obtained via a sample consisting of 1/1000 of the data items present in the set examined and repeating the test five times. The times are all expressed in milliseconds.

Validation

Figure 20:
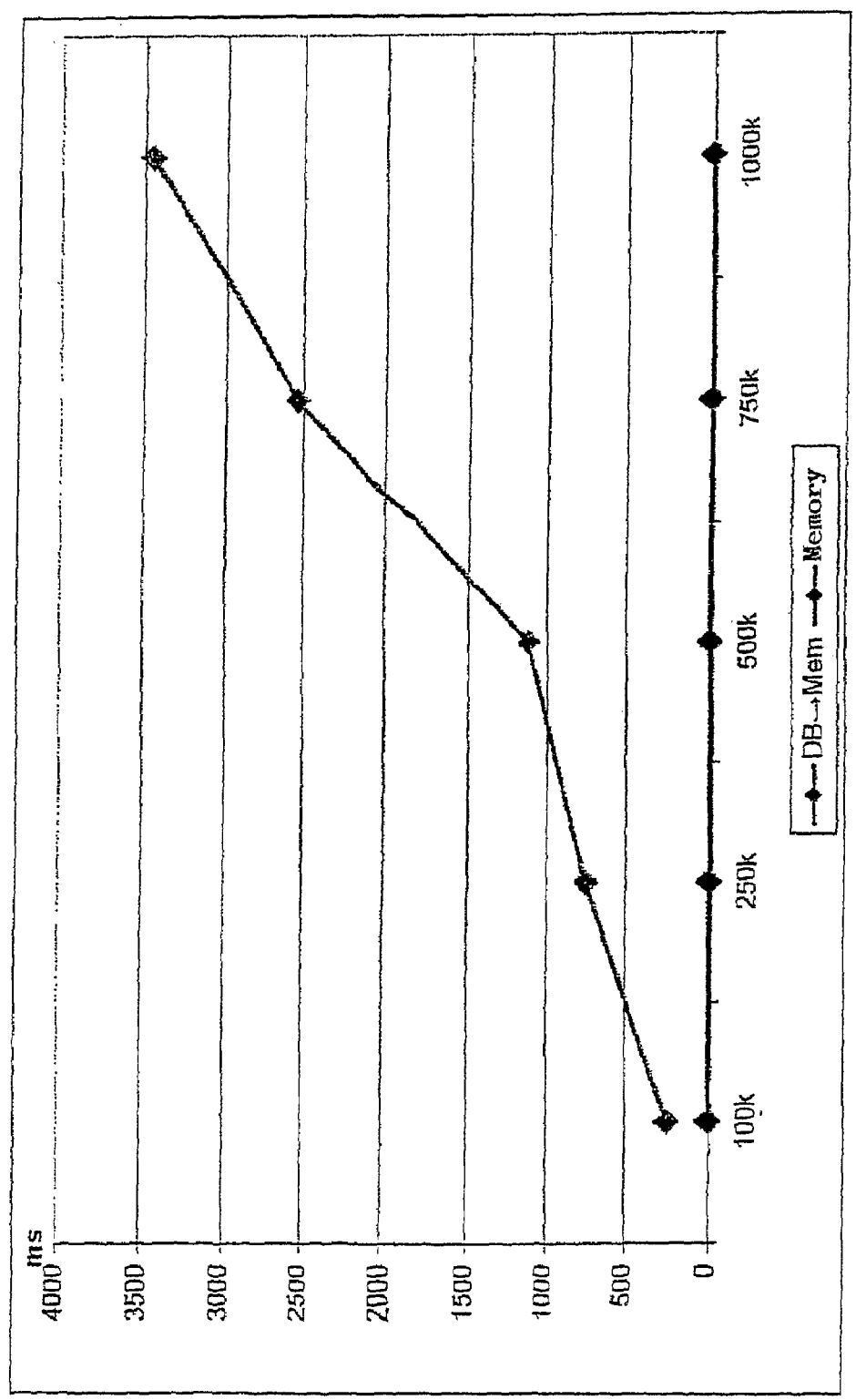
FIG. 20 shows the results of the test on verification of the presence of an element in a relational table.

The test illustrated in FIG. 20 demonstrates the validity of the architecture produced; in fact, although a very high standard deviation is present, the mean scales up perfectly, obtaining a constant value in all the tests. The reasons for this standard deviation are connected with internal database mechanisms, not controllable from the outside. This consideration derives from a detailed analysis of the results, from which it was observed that the values that gave rise to prolonged times varied when the test was repeated on the same data.

| # elements | I DB -> Mem (ms) | Memory (ms) |
|---|---|---|
| 100k | 252 | 2 |
| 250k | 755 | 2 |
| 500k | 1119 | 2 |
| 750k | 2532 | 2 |
| 1000k | 3449 | 2 |

Figure 21:
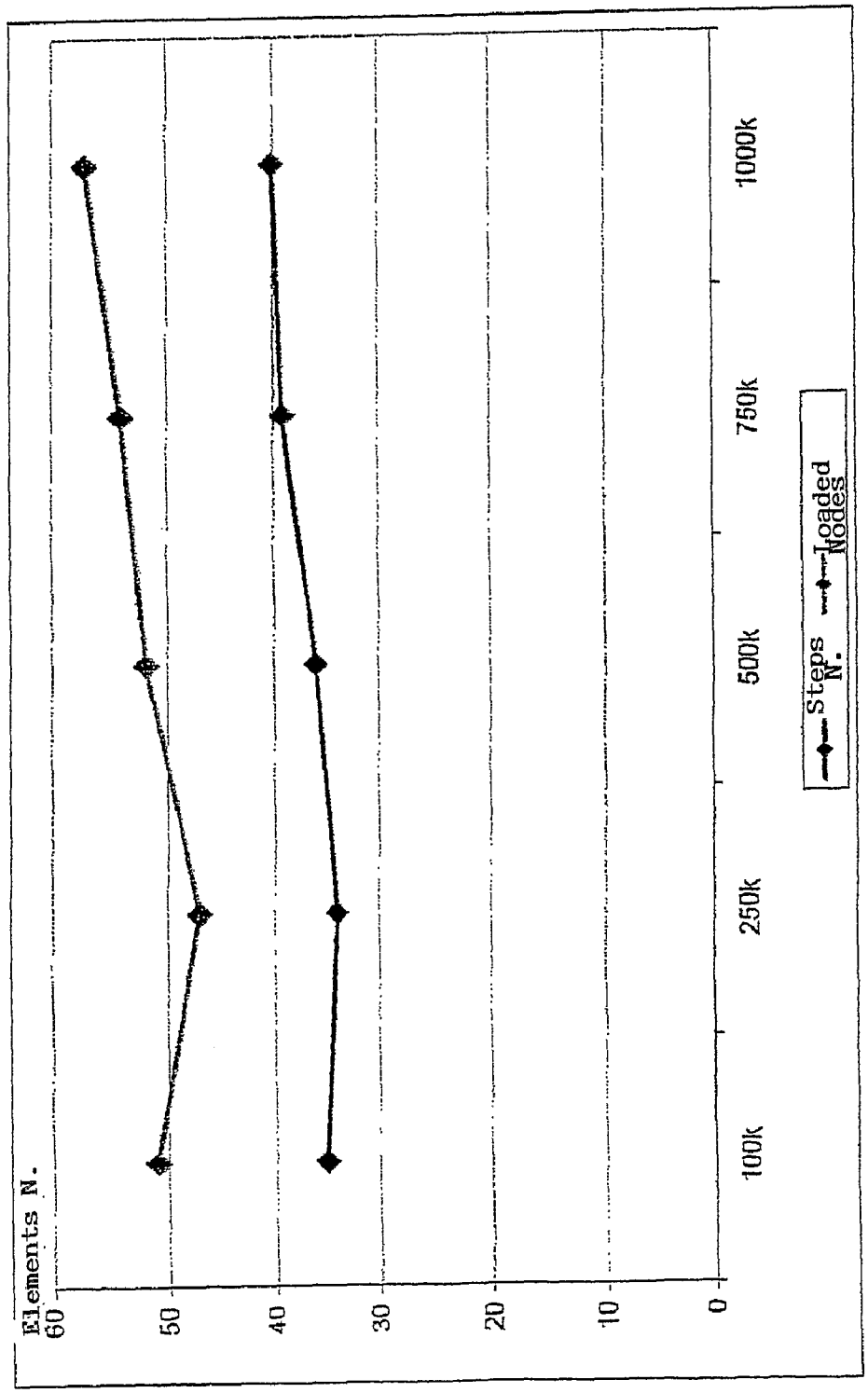
FIG. 21 is a graph representing the towers and steps necessary in which the number of nodes to authenticate a data item and the relative overhead are indicated.

The test illustrated in FIG. 21 concerns the data structure regardless of the type of machine used to perform the tests. The number of nodes loaded in memory and the number of steps used to construct the root path are analysed. The difference between the two values represents the authentication structural overhead.

| # elements I | No. steps | Nodes loaded |
|---|---|---|
| 100k | 35 | 51 |
| 250k | 34 | 47 |
| 500k | 36 | 52 |
| 750k | 39 | 54 |
| 1000k | 40 | 57 |

Figure 22:
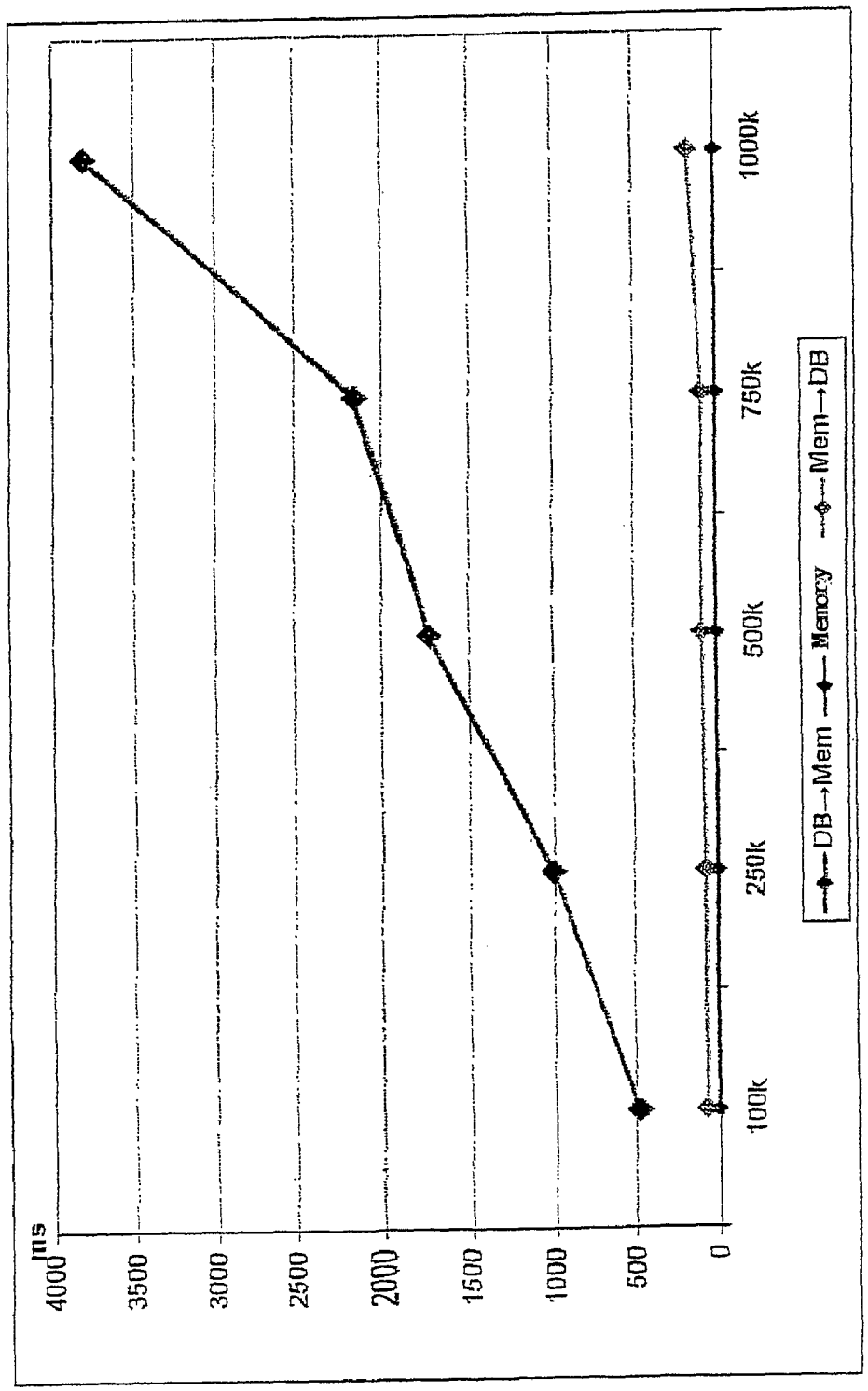
FIG. 22 shows the results of the test on insertion of a data item in a relational table.

The test illustrated in FIG. 22 takes into consideration dynamic management of the authenticated table, showing the increase in the mean time required to load the elements necessary for maintaining the security of the data structure, as the reference set increases. It is interesting to note that the time for loading the records in memory grows linearly with the dimension of the set; this is due to the longer time taken by the DBMS to locate the data as the dimensions of the data set increase (first column of the graph).

The times for insertion in memory and likewise for verification are practically constant; the latter, together with the times for reinsertion in the database of the updated elements, which are inserted in a non-ordered manner, take less time than the memory loading operation.

| # elements | DB->Mem (ms) | Memory (ms) | Mem->DB (ms) |
|---|---|---|---|
| 100k | 478 | 2 | 71 |
| 250k | 991 | 1 | 71 |
| 500k | 1736 | 1 | 86 |
| 750k | 2128 | 2 | 83 |
| 1000k | 3800 | 3 | 160 |

CONCLUSIONS

From the above, it is clear that the present invention proposes a method for the dynamic secure management of an authenticated relational table forming part of a database; the method comprises the following phases:

store the authenticated relational table in a secondary memory with a high storage capacity and a slow data access time;

maintain an authenticated skip list within the authenticated relational table in order to produce an authentication superstructure;

determine a signed hash or basis value which characterises the entire authenticated relational table;

authenticate the presence or absence of a set of elements belonging to the skip list by means of a root path suitable for calculating a hash verification value which is comparable with the signed hash value that characterises the entire authenticated relational table;

validate the result of the authentication step checking that the hash verification value calculated via the root path is equal to the signed hash value which characterises the entire authenticated relational table;

maintain, via a dynamic management, the authenticated relational table in the secondary memory;

define a logarithmic subset of the records present in the authenticated relational table which contains the records strictly necessary for reconstruction of the root path;

load, by means of appropriate queries, the logarithmic subset of the records strictly necessary for reconstruction of the root path in a central primary memory, which has a limited storage capacity and a fast data access time; and reduce the number of queries to be made for loading the logarithmic subset using a "funnel" technique according to which, having established an element to be authenticated, we load from the secondary memory to the primary memory all the elements found: within the interval between two towers which include the element in question to be authenticated; on the lower level with respect to the level of the element in question to be authenticated; and on the maximum level with a value lower than the element in question to be authenticated.

The invention claimed is:

1. Method for a dynamic management of an authenticated relational table forming part of a database; the method comprising:

providing a primary memory;

storing the authenticated relational table in a secondary memory with a storage capacity that is higher than the storage capacity of the primary memory and a data access time that is slower than the data access time of the primary memory;

maintaining an authenticated skip list within the authenticated relational table in order to create an authentication superstructure;

determining a signed hash or basis value which characterizes the entire authenticated relational table;

authenticating the presence or otherwise of a set (S) of elements stored in an authenticated table (TA) comprising a hash tree (T) belonging to the skip list via a root path suitable for calculating a verification hash value comparable to the signed hash value which characterizes the entire authenticated relational table, wherein when verifying whether an element is present in a skip list, if the data item is present, a calculation is made that calculates a root path from an element found at a lowest level of the skip list that arrives at a root on the extreme left at a highest level of the skip list, the authenticated table (TA) for the set (S) further comprising a joint signature of a time marker and a value (f(r)) kept in a root (r) of the hash tree (T), wherein an element (x) belongs to the set (S) if it can be verified by control of a sequence of values stored in elements adjoining nodes of the path from the element (x) to the root (r), wherein the validation process recalculates the root label via hashing of labels in the sequence in an appropriate order;

validating the result of the authentication step by checking that the verification hash value calculated by means of the root path is equal to the signed hash value that characterizes the entire authenticated relational table;

maintaining, via the dynamic management, the authenticated relational table in the secondary memory, wherein the dynamic management permits frequent insertions and deletions in the authenticated relational table while maintaining a hierarchical order;

defining a logarithmic subset of the records present in the authenticated relational table which contains the records necessary for reconstruction of the root path;

loading, by means of appropriate queries to the authentication table permitting efficient selection only of the elements necessary for authentication, the logarithmic subset of the records necessary for reconstruction of the root path in the primary memory; and establishing an element to be authenticated and then reducing the number of queries to be made for loading the logarithmic subset using a "funnel" technique according to which, from the secondary memory to the primary memory all the following elements are loaded:

elements located within the interval between two towers of the skip list which include the element to be authenticated;

elements located on the lower level of the skip list with respect to the level of the element to be authenticated; and elements located on the maximum level of the skip list and having a value lower than the element to be authenticated.

2. Method as claimed in claim 1, wherein the skip list has a coarse granularity and uses a record to represent each tower.

3. Method as claimed in claim 1, wherein the skip list has a fine granularity and a record is used to represent each individual element of the tower at different levels.

4. Method as claimed in claim 1, wherein it is possible to authenticate the queries made on said authenticated relational table via the secure use of relational primitives.

5. Method as claimed in claim 1, wherein a user can make a query for updating, inserting or deleting data present in the authenticated relational table calculating the new signed hash (basis) value which characterises the entire authenticated relational table and accessing a small information subset.

6. Method as claimed in claim 1, wherein the application is external to a DBMS, while all the data, including those for authentication, belong to the database.

7. Method as claimed in claim 1, wherein the authenticated skip list is realised via the use of a normally collision-resistant commutative hash function.

8. Method as claimed in claim 1, wherein the authentication is performed at the single element level, constructing an authenticated skip list for each field of the table plus a further authenticated skip list to authenticate the set of fields that make up an entire record.

9. Method as claimed in claim 1, wherein the authentication is performed at the level of a record, constructing an authenticated skip list which authenticates the entire record starting from a hash value calculated by accumulating all the elements belonging to the record.

10. Method as claimed in claim 2, wherein creation of the skip list takes account of the presence of towers with a different number of levels, which are adapted to the highest tower; in order to fill all the levels of the towers that do not have maximum height, the "null" value is inserted in the skip list.

11. Method as claimed in claim 2 wherein nested set techniques are used for optimisation of the selection queries.

12. Method as claimed in claim 7, wherein the normally collision-resistant commutative hash function is constructed according to the following formula:

$$h'(x,y)=h(\min\{x,y\},\max\{x,y\})$$

where:
$h'(x, y)$ is a collision-resistant commutative hash function; and
$h(x, y)$ is a collision-resistant hash function.

* * * * *